(12) United States Patent
Engebretson

(10) Patent No.: US 8,745,243 B2
(45) Date of Patent: *Jun. 3, 2014

(54) FCIP COMMUNICATIONS WITH LOAD SHARING AND FAILOVER

(75) Inventor: Robert Grant Engebretson, Medina, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 765 days.

This patent is subject to a terminal disclaimer.

(21) Appl. No.: 12/880,495

(22) Filed: Sep. 13, 2010

(65) Prior Publication Data

US 2011/0225303 A1    Sep. 15, 2011

Related U.S. Application Data

(63) Continuation-in-part of application No. 12/534,457, filed on Aug. 3, 2009, now Pat. No. 8,412,831.

(51) Int. Cl.
*G06F 15/16* (2006.01)
*H04L 12/56* (2006.01)
*H04L 29/08* (2006.01)
*H04L 29/06* (2006.01)

(52) U.S. Cl.
CPC .............. *H04L 47/193* (2013.01); *H04L 69/16* (2013.01); *H04L 67/1097* (2013.01); *H04L 69/169* (2013.01); *H04L 47/2408* (2013.01); *H04L 47/125* (2013.01)
USPC ........................... 709/227; 370/230; 370/235

(58) Field of Classification Search
USPC ................................... 709/227; 370/230, 235
See application file for complete search history.

(56) References Cited

U.S. PATENT DOCUMENTS

| | | | | |
|---|---|---|---|---|
| 5,991,302 A * | 11/1999 | Berl et al. | ...................... | 370/400 |
| 7,149,795 B2 * | 12/2006 | Sridhar et al. | ................ | 709/223 |
| 7,308,001 B2 * | 12/2007 | Collette et al. | ................ | 370/471 |
| 7,505,401 B2 * | 3/2009 | Kashyap | ....................... | 370/217 |
| 7,782,784 B2 * | 8/2010 | Agrawal et al. | ............. | 370/236.2 |
| 7,949,792 B2 * | 5/2011 | Kujk et al. | ..................... | 709/250 |
| 8,238,347 B2 * | 8/2012 | DeSanti et al. | ............. | 370/395.5 |
| 8,307,048 B2 * | 11/2012 | Brown et al. | .................. | 709/217 |
| 8,412,831 B2 * | 4/2013 | Detrick et al. | ................ | 709/227 |
| 2002/0054567 A1 * | 5/2002 | Fan | ................................. | 370/230 |
| 2004/0146063 A1 * | 7/2004 | Golshan et al. | ............... | 370/428 |
| 2004/0218531 A1 * | 11/2004 | Cherian et al. | ................ | 370/235 |
| 2006/0126520 A1 * | 6/2006 | Nambiar et al. | .............. | 370/248 |
| 2007/0011318 A1 * | 1/2007 | Roth | ............................. | 709/224 |
| 2007/0286233 A1 * | 12/2007 | Latif et al. | ..................... | 370/466 |
| 2010/0208730 A1 * | 8/2010 | Henderson et al. | ........... | 370/389 |
| 2011/0029676 A1 * | 2/2011 | Detrick et al. | ................ | 709/227 |

* cited by examiner

*Primary Examiner* — Duyen Doan
(74) *Attorney, Agent, or Firm* — Wong, Cabello, Lutsch, Rutherford & Brucculeri, L.L.P.

(57) ABSTRACT

An IP gateway device establishes distinct TCP sessions within a single FCIP tunnel, each TCP session being designated for a different priority of service (e.g., high, medium, low), plus a control stream. Each TCP session has its own TCP stack and its own settings for VLAN Tagging (IEEE 802.1Q), quality of service (IEEE 802.1P) and Differentiated Services Code Point (DSCP). By distributing data streams assigned to different priorities of service into different TCP sessions within the FCIP tunnel, an IP gateway device can preserve the distinctions between the data stream priorities while the data traffic is within the IP network. By further distributing the data streams between different circuits and trunks by use of multiple circuits, failover and load balancing can occur within the FCIP tunnels.

22 Claims, 22 Drawing Sheets

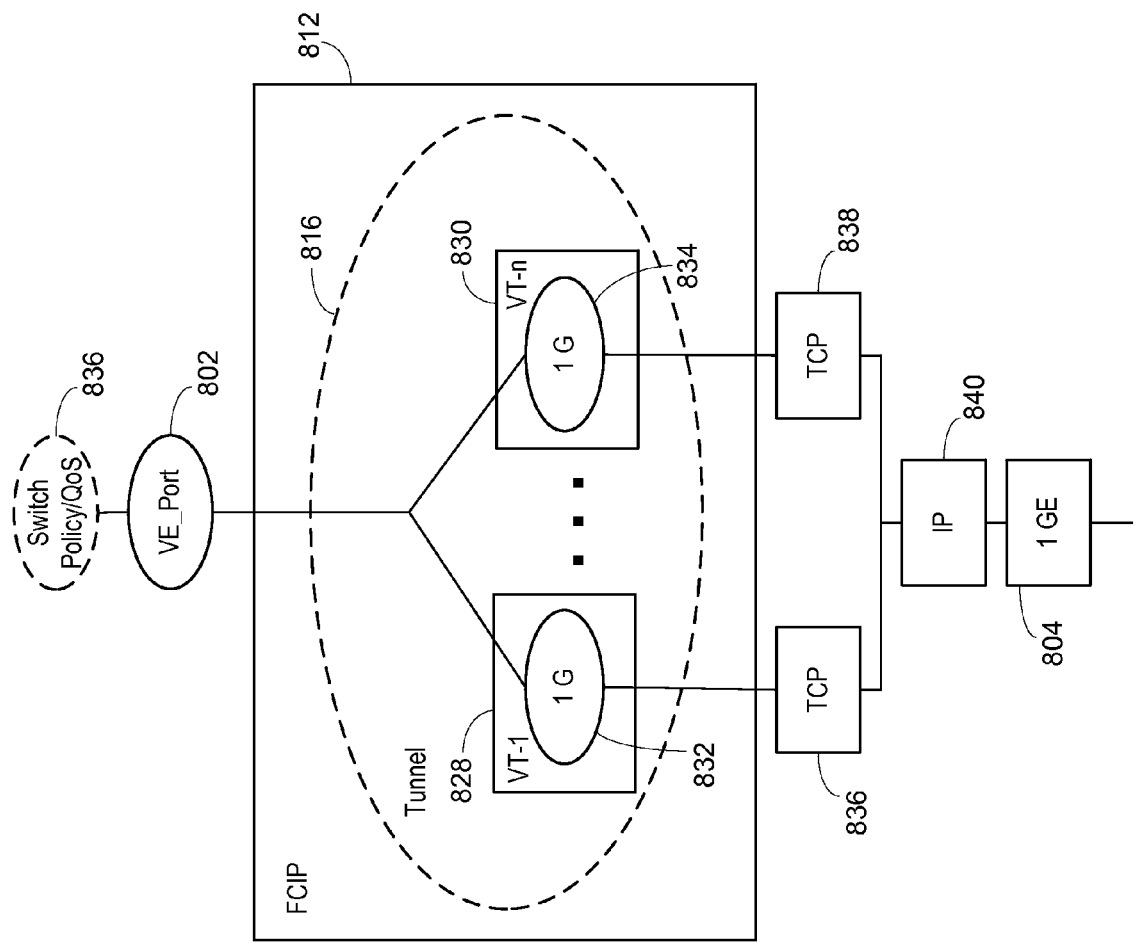

FCIP COMMUNICATIONS WITH LOAD SHARING AND FAILOVER

RELATED APPLICATIONS

This application is a continuation-in-part of U.S. application Ser. No. 12/534,457, entitled "Per Priority TCP Quality of Service," by Mark Detrick, Benjamin Hart, Robert Engebretson, and Senthilkumar Narayanasamy, filed Aug. 3, 2009 now U.S. Pat. No. 8,412,831, which is hereby incorporated by reference.

BACKGROUND

A storage area network (SAN) may be implemented as a high-speed, special purpose network that interconnects different kinds of data storage devices with associated data servers on behalf of a large network of users. Typically, a storage area network includes high performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FCIP (Fibre Channel over IP), etc.).

As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices.

FC standards have defined limited allowable distances between FC switch elements. Fibre Channel over IP (FCIP) refers to mechanisms that allow the interconnection of islands of FC SANs over IP-based (internet protocol-based) networks to form a unified SAN in a single FC fabric, thereby extending the allowable distances between FC switch elements to those allowable over an IP network. For example, FCIP relies on IP-based network services to provide the connectivity between the SAN islands over local area networks (LANs), metropolitan area networks (MANs), and wide area networks (WANs). Accordingly, using FCIP, a single FC fabric can connect physically remote FC sites allowing remote disk access, tape backup, and live mirroring.

In an FCIP implementation, FC traffic is carried over an IP network through a logical FCIP tunnel. Each FCIP entity on either side of the IP network works at the session layer of the OSI model. The FC frames from the FC SANs are encapsulated in IP packets and transmission control protocol (TCP) segments and transported in accordance with the TCP layer in a single TCP session. For example, an FCIP tunnel is created over the IP network and a TCP session is opened in the FCIP tunnel. All traffic is then communicated through the FCIP tunnel in the same TCP session.

Different priorities may be assigned to different FC data streams to provide different levels of quality of service (QoS). For example, a video data stream may be given a higher priority than a tape backup data stream, which is not as sensitive to performance problems or to the inherent delays in reordering packets that have arrived out-of-order. However, by passing FCIP traffic through a single TCP session, all levels of service are similarly affected during IP network congestion. As such, all FCIP traffic in the FCIP tunnel is effectively treated with the same level of priority. In this implementation, FC data streams having different levels of priority (e.g., different qualities of service or QoS levels) may lose their distinct priorities while in the IP network.

An additional problem is that an FCIP tunnel is between one IP address pair, which means that connections can become heavily loaded and more capacity is required or that failure can readily occur due to line problems and the like.

SUMMARY

Implementations described and claimed herein address the foregoing problems by establishing distinct TCP sessions within a single FCIP tunnel, each TCP session being designated for a different priority of service (e.g., high, medium, low), plus a control stream. Each TCP session has its own TCP stack and its own settings for VLAN Tagging (IEEE 802.1Q), quality of service (IEEE 802.1P) and Differentiated Services Code Point (DSCP). By distributing data streams assigned to different priorities of service into different TCP sessions within the FCIP tunnel, an IP gateway device (e.g. an FCIP extension device) can preserve the distinctions between the data stream priorities while the data traffic is within the IP network. By further distributing the data streams between different circuits and utilizing trunks, failover and load balancing can occur within the FCIP tunnels.

Other implementations are also described and recited herein.

BRIEF DESCRIPTIONS OF THE DRAWINGS

FIGS. 6-24 illustrate various examples of FCIP tunnels, trunks and circuits.

DETAILED DESCRIPTIONS

Figure 1:
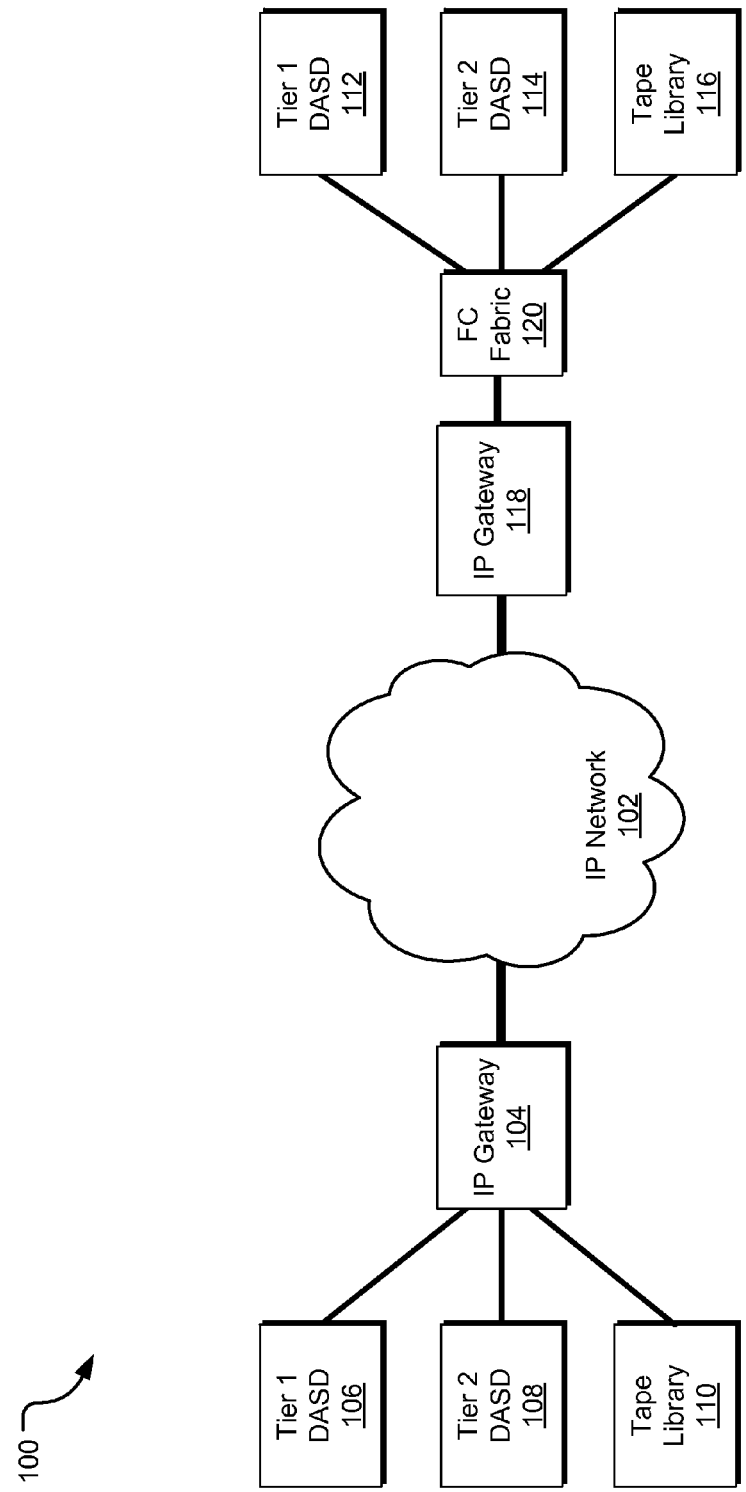
FIG. 1 illustrates an example FCIP configuration using distinct per-priority TCP sessions within a single FCIP tunnel over an IP network.

FIG. 1 illustrates an example FCIP configuration 100 using distinct per-priority TCP sessions within a single FCIP tunnel over an IP network 102. An IP gateway device 104 (e.g., an FCIP extender), couples example FC source nodes (e.g., Tier 1 Direct Access Storage Device (DASD) 106, Tier 2 DASD 108, and a tape library 110) to the IP network 102 for communication to example FC destination nodes (e.g., Tier 1 DASD 112, Tier 2 DASD 114, and a tape library 116, respectively) through an IP gateway device 118 (e.g., another FCIP extender) and an FC fabric 120. Generally, an IP gateway device interfaces to an IP network. In the specific implementation illustrated in FIG. 1, the IP gateway device 118 interfaces between an IP network and an FC fabric, but other IP gateway devices may include tape extension devices, Ethernet network interface controllers (NICs), host bus adapters (HBAs), and director level switches). An example application of such an FCIP configuration would be a remote data replication (RDR) scenario, wherein the data on the Tier 1 DASD 106 is backed up to the remote Tier 1 DASD 112 at a high priority, the data on the Tier 2 DASD 108 is backed up to the remote Tier 2 DASD 114 at a medium priority, and data on the tape library 110 is backed up to the remote tape library 116 at a low priority. In addition to the data streams, a control stream is also communicated between the IP gateway devices 104 and 118 to pass class-F control frames.

The IP gateway device 104 encapsulates FC packets received from the source nodes 106, 108, and 110 in TCP segments and IP packets and forwards the TCP/IP-packet-encapsulated FC frames over the IP network 102. The IP gateway device 118 receives these encapsulated FC frames from the IP network 102, "de-encapsulates" them (i.e., extracts the FC frames from the received IP packets and TCP segments), and forwards the extracted FC frames through the FC fabric 120 to their appropriate destination nodes 112, 114, and 116. It should be understood that each IP gateway device 104 and 118 can perform the opposite role for traffic going in the opposite direction (e.g., the IP gateway device 118 doing the encapsulating and forwarding through the IP network 102 and the IP gateway device 104 doing the de-encapsulating and forwarding the extracted FC frames through an FC fabric). In other configurations, an FC fabric may or may not exist on either side of the IP network 102. As such, in such other configurations, at least one of the IP gateway devices 104 and 118 could be a tape extender, an Ethernet NIC, etc.

Each IP gateway device 104 and 118 includes an IP interface, which appears as an end station in the IP network 102. Each IP gateway device 104 and 118 also establishes a logical FCIP tunnel through the IP network 102. The IP gateway devices 104 and 118 implement the FCIP protocol and rely on the TCP layer to transport the TCP/IP-packet-encapsulated FC frames over the IP network 102. Each FCIP tunnel between two IP gateway devices connects two TCP end points in the IP network 102. Viewed from the FC perspective, pairs of switches export virtual E_PORTs or virtual EX_PORTs (collectively referred to as virtual E_PORTs) that enable forwarding of FC frames between FC networks, such that the FCIP tunnel acts as an FC InterSwitch Link (ISL) over which encapsulated FC traffic flows.

The FC traffic is carried over the IP network 102 through the FCIP tunnel between the IP gateway device 104 and the IP gateway device 118 in such a manner that the FC fabric 102 and all purely FC devices (e.g., the various source and destination nodes) are unaware of the IP network 102. As such, FC datagrams are delivered in such time as to comply with applicable FC specifications.

To accommodate multiple levels of priority, the IP gateway devices 104 and 118 create distinct TCP sessions for each level of priority supported, plus a TCP session for a class-F control stream. In one implementation, low, medium, and high priorities are supported, so four TCP sessions are created between the IP gateway devices 104 and 118, although the number of supported priority levels and TCP sessions can vary depending on the network configuration. The control stream and each priority stream is assigned its own TCP session that is autonomous in the IP network 102, getting its own TCP stack and its own settings for VLAN Tagging (IEEE 802.1Q), quality of service (IEEE 802.1P) and Differentiated Services Code Point (DSCP). Furthermore, the traffic flow in each per priority TCP session is enforced in accordance with its designated priority by an algorithm, such as but not limited to a deficit weighted round robin (DWRR) scheduler. All control frames in the class-F TCP session are strictly sent on a per service interval basis.

Figure 2:
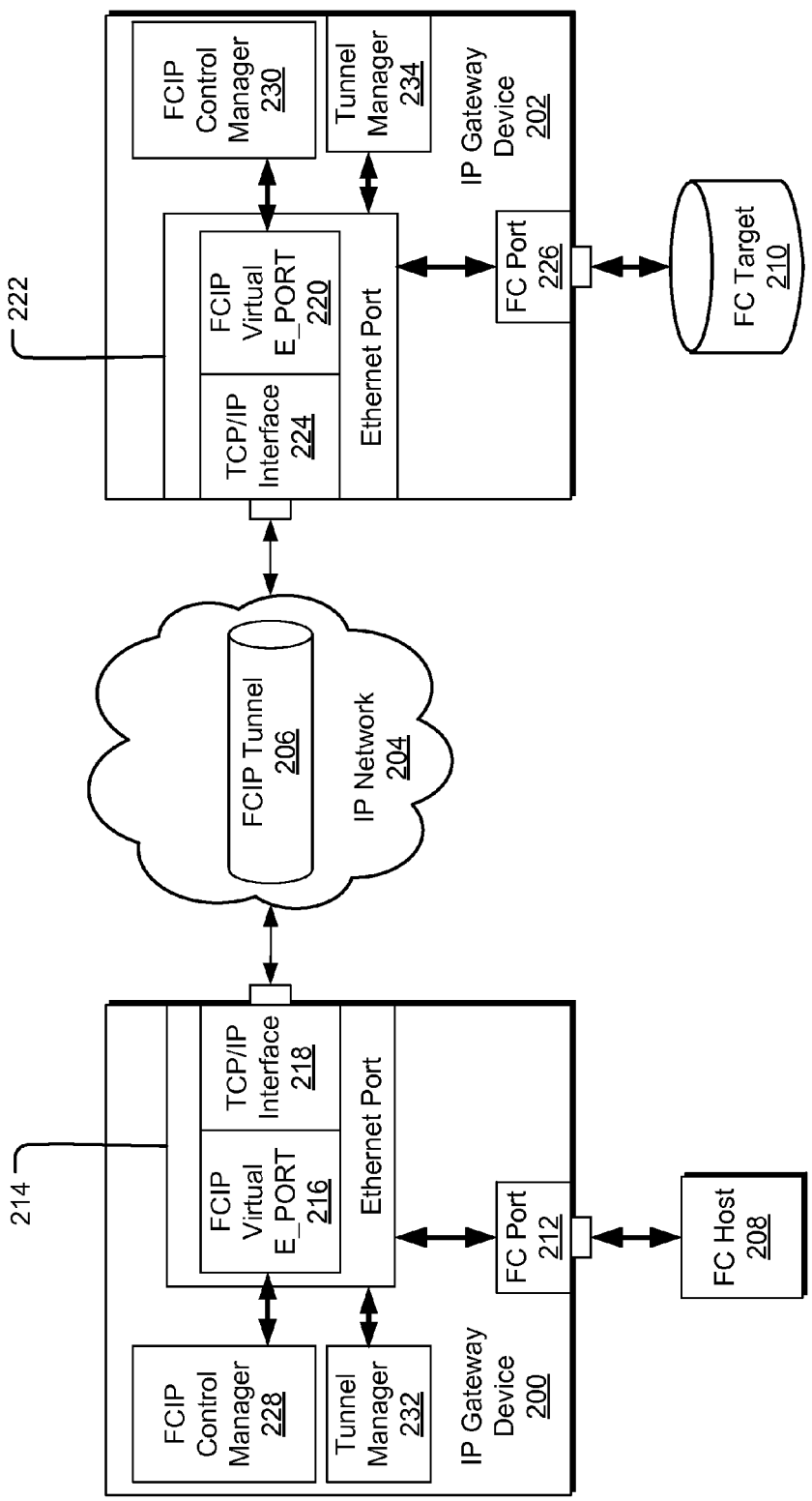
FIG. 2 illustrates example IP gateway devices communicating over an IP network using distinct per priority TCP sessions within a single FCIP.

FIG. 2 illustrates example IP gateway devices 200 and 202 (e.g., FCIP extension devices) communicating over an IP network 204 using distinct per priority TCP sessions within a single FCIP tunnel 206. An FC host 208 is configured to send data to an FC target 210 through the IP network 204. It should be understood that other data streams between other FC source devices (not shown) and FC target devices (not shown) can be communicated at various priority levels over the IP network 204.

The FC host 208 couples to an FC port 212 of the IP gateway device 200. The coupling may be made directly between the FC port 212 and the FC host 208 or indirectly through an FC fabric (not shown). The FC port 212 receives FC frames from the FC host 208 and forwards them to an Ethernet port 214, which includes an FCIP virtual E_PORT 216 and a TCP/IP interface 218 coupled to the IP network 204. The FCIP virtual E_PORT 216 acts as one side of the logical ISL formed by the FCIP tunnel 206 over the IP network 204. An FCIP virtual E_PORT 220 in the IP gateway device 202 acts as the other side of the logical ISL. The Ethernet port 214 encapsulates each FC frame received from the FC port 212 in a TCP segment belonging to the TCP session for the designated priority and an IP packet shell and forwards them over the IP network 204 through the FCIP tunnel 206.

The FC target 210 couples to an FC port 226 of the IP gateway device 202. The coupling may be made directly between the FC port 226 and the FC host 210 or indirectly through an FC fabric (not shown). An Ethernet port 222 receives TCP/IP-packet-encapsulated FC frames over the IP network 204 from the IP gateway device 200 via a TCP/IP interface 224. The Ethernet port 222 de-encapsulates the received FC frames and forwards them to an FC port 226 for communication to the FC target device 210.

It should be understood that data traffic can flow in either direction between the FC host 208 and the FC target 210. As such, the roles of the IP gateway devices 200 and 202 may be swapped for data flowing from the FC target 210 and the FC host 208.

Tunnel manager modules 232 and 234 (e.g., circuitry, firmware, software or some combination thereof) of the IP gateway devices 200 and 202 set up and maintain the FCIP tunnel 206. Either IP gateway device 200 or 202 can initiate the FCIP tunnel 206, but for this description, it is assumed that the IP gateway device 200 initiates the FCIP tunnel 206. After the Ethernet ports 214 and 222 are physically connected to the IP network 204, data link layer and IP initialization occur. The TCP/IP interface 218 obtains an IP address for the IP gateway device 200 (the tunnel initiator) and determines the IP address and TCP port numbers of the remote IP gateway device 202. The FCIP tunnel parameters may be configured manually, discovered using Service Location Protocol Version 2 (SLPv2), or designated by other means. The IP gateway device 200, as the tunnel initiator, transmits an FCIP Special Frame (FSF) to the remote IP gateway device 202. The FSF contains the FC identifier and the FCIP endpoint identifier of the IP gateway device 200, the FC identifier of the remote IP gateway device 202, and a 64-bit randomly selected number that uniquely identifies the FSF. The remote IP gateway device 202 verifies that the contents of the FSF match its local configuration. If the FSF contents are acceptable, the unmodified FSF is echoed back to the (initiating) IP gateway device 200. After the IP gateway device 200 receives and verifies the FSF, the FCIP tunnel 206 can carry encapsulated FC traffic.

The TCP/IP interface 218 creates multiple TCP sessions through the single FCIP tunnel 206. In the illustrated implementation, three or more TCP sessions are created in the single FCIP tunnel 206. One TCP session is designated to carry control data (e.g., class-F data), and the remaining TCP sessions are designated to carry data streams having different levels of priority. For example, considering a three priority QoS scheme, four TCP sessions are created in the FCIP tunnel 206 between the IP gateway device 200 and the IP gateway device 202, one TCP session designated for control data, and the remaining TCP sessions designated for high, medium, and low priority traffic, respectively. Note: It should be understood that multiple TCP sessions designated with the same level of priority may also be created (e.g., two high priority TCP sessions) within the same FCIP tunnel.

The FCIP tunnel 206 maintains frame ordering within each priority TCP flow. The QoS enforcement engine may alter the egress transmission sequence of flows relative to their ingress sequence based on priority. However, the egress transmission sequence of frames within an individual flow will remain in the same order as their ingress sequence to that flow. Because the flows are based on FC initiator and FC target, conversational frames between two FC devices will remain in proper sequence. A characteristic of TCP is to maintain sequence order of bytes transmitted before deliver to upper layer protocols. As such, the IP gateway device at the remote end of the FCIP tunnel 206 is responsible for reordering data frames received from the various TCP sessions before sending them up the communications stack to the FC application layer. Furthermore, in one implementation, each TCP session can service as a backup in the event a lower (or same) priority TCP session fails. Each TCP session can be routed and treated independently of others via autonomous settings for VLAN and Priority Tagging and/or DSCP.

In addition to setting up the FCIP tunnel 206, the IP gateway device 200 may also set up TCP trunking through the FCIP tunnel 206. TCP trunking allows the creation of multiple FCIP circuits within the FCIP tunnel 206, with each FCIP circuit connecting a source-destination IP address pair. In addition, each FCIP circuit can maintain multiple TCP sessions, each TCP session being designated for different priorities of service. As such, each FCIP circuit can have different attributes, such as IP addresses, committed rates, priorities, etc., and can be defined over the same Ethernet port or over different Ethernet ports in the IP gateway device. The trunked FCIP circuits support load balancing and provide failover paths in the event of a network failure, while maintaining in-order delivery. For example, if one FCIP circuit in the FCIP trunk fails or becomes congested, data can be redirected to a same-priority TCP session of another FCIP circuit in the FCIP tunnel 206. The IP gateway device 202 receives the TCP/IP-packet-encapsulated FC frames and reconstitutes the data streams in the appropriate order through the FCIP virtual E_PORT 220. These variations are described in more detail below.

Each IP gateway device 200 and 202 includes an FCIP control manager (see FCIP control managers 228 and 230), which generate the class-F control frames for the control data stream transmitted through the FCIP tunnel 206 to the FCIP control manager in the opposing IP gateway device. Class-F traffic is connectionless and employs acknowledgement of delivery or failure of delivery. Class-F is employed with FC switch expansion ports (E PORTS) and is applicable to the IP gateway devices 200 and 202, based on the FCIP virtual E_PORT 216 and 220 created in each IP gateway device. Class-F control frames are used to exchange routing, name service, and notifications between the IP gateway devices 200 and 202, which join the local and remote FC networks into a single FC fabric. However, the described technology is not limited to combined single FC fabrics and is compatible with FC routed environments.

The IP gateway devices 200 and 202 emulate raw FC ports (e.g., VE_PORTs or VEX_PORTs) on both of the FCIP tunnel 206. For FC I/O data flow, these emulated FC ports support ELP (Exchange Link Parameters), EFP (Exchange Fabric Parameters), and other FC-FS (Fibre Channel—Framing and Signaling) and FC-SW (Fibre Channel—Switched Fabric) protocol exchanges to bring the emulated FC E_PORTs online. After the FCIP tunnel 206 is configured and the TCP sessions are created for an FCIP circuit in the FCIP tunnel 206, the IP gateway devices 200 and 202 will activate the logical ISL over the FCIP tunnel 206. When the ISL has been established, the logical FC ports appear as virtual E_PORTs in the IP gateway devices 200 and 202. For FC fabric services, the virtual E_PORTs emulate regular E_PORTs, except that the underlying transport is TCP/IP over an IP network, rather than FC in a normal FC fabric. Accordingly, the virtual E_PORTs 216 and 220 preserve the "semantics" of an E_PORT.

Figure 3:
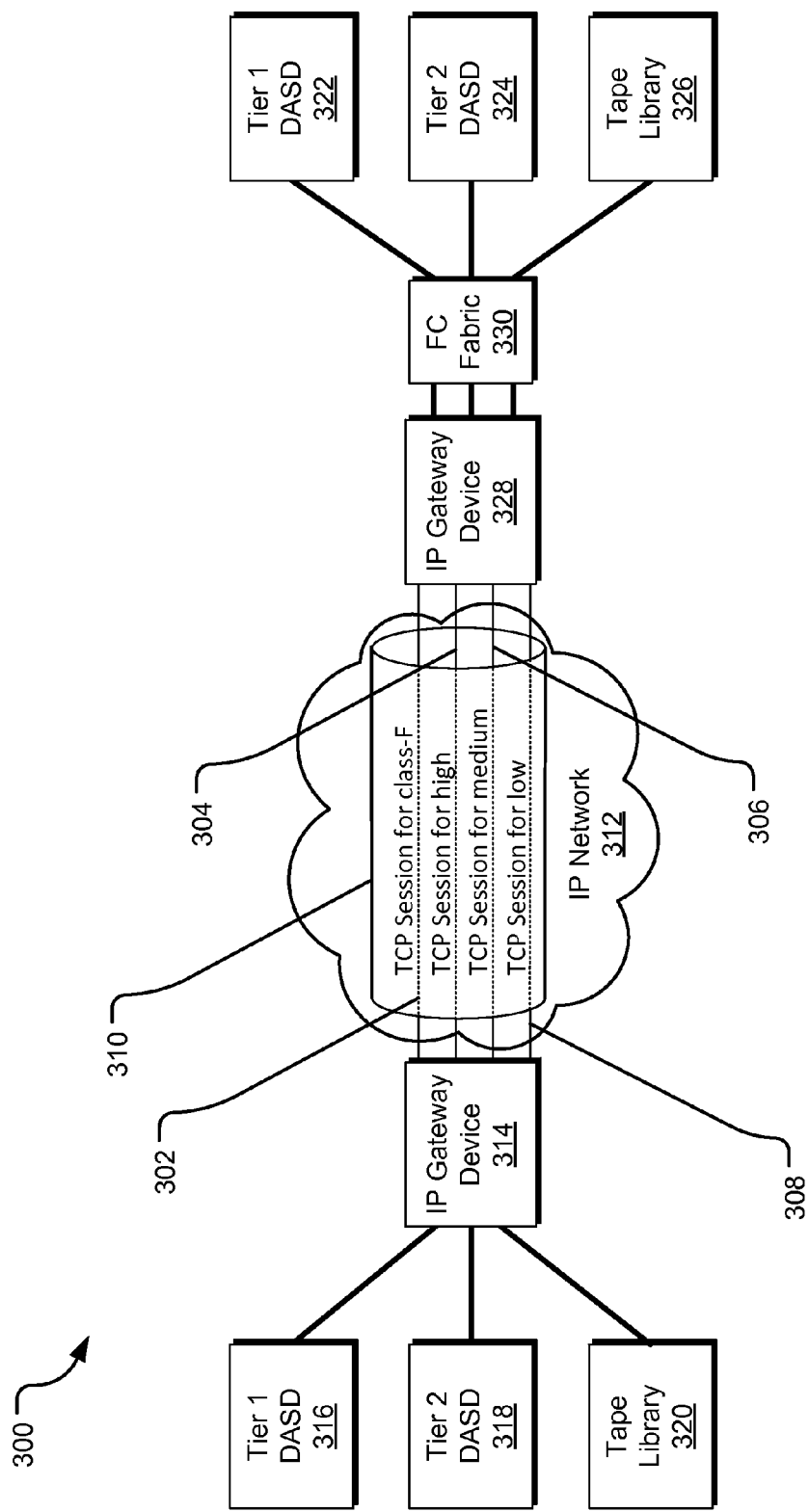
FIG. 3 illustrates an example FCIP configuration showing distinct per priority TCP sessions within a single FCIP tunnel over an IP network.

FIG. 3 illustrates an example FCIP configuration 300 showing distinct per priority TCP sessions 302, 304, 306, and 308 within a single FCIP tunnel 310 over an IP network 312. An IP gateway device 314 (e.g., an FCIP extender) couples example FC source nodes (e.g., Tier 1 Direct Access Storage Device (DASD) 316, Tier 2 DASD 318, and a tape library 320) to the IP network 312 for communication to example FC destination nodes (e.g., Tier 1 DASD 322, Tier 2 DASD 324, and a tape library 326, respectively) through an IP gateway device 328 (e.g., an FCIP extender) and an FC fabric 330. An example application of such an FCIP configuration would be a remote data replication (RDR) scenario, wherein the data on the Tier 1 DASD 316 is backed up to the remote Tier 1 DASD 322 at a high priority, the data on the Tier 2 DASD 318 is backed up to the remote Tier 2 DASD 324 at a medium priority, and data on the table library 320 is backed up to the remote tape library 326 at a low priority.

Within the single FCIP tunnel 310, individual TCP sessions are created between the source IP address (e.g., of the IP gateway device 314) and the destination IP address (e.g., of the IP gateway device 328). Each data stream of a certain priority is designated for a particular TCP session in the FCIP tunnel 310. In addition to the prioritized data streams 304, 306, and 308, a control stream 302 is also provided between the IP gateway devices 314 and 328 to pass class-F control frames.

In one implementation, operating at the media access controller (MAC) level, data frames are designated with a priority in accordance with IEEE 802.1p, although other priority schemes may be supported. In IEEE 802.1p, a 3-bit Priority Code Point in the IEEE 802.1Q frame header indicates the frame priority level from 0 (lowest) to 7 (highest). In an alternative implementation, at the IP level, bits set in the DSCP field of the IP packet header identify the priority of the packet, such that the IP gateway device can distribute the data frames to the TCP sessions appropriate for their identified priorities. Furthermore, it should be understood that the FCIP tunnel 310 many include multiple FCIP circuits in a TCP trunked configuration, with each FCIP circuit maintaining multiple TCP sessions.

Figure 4:
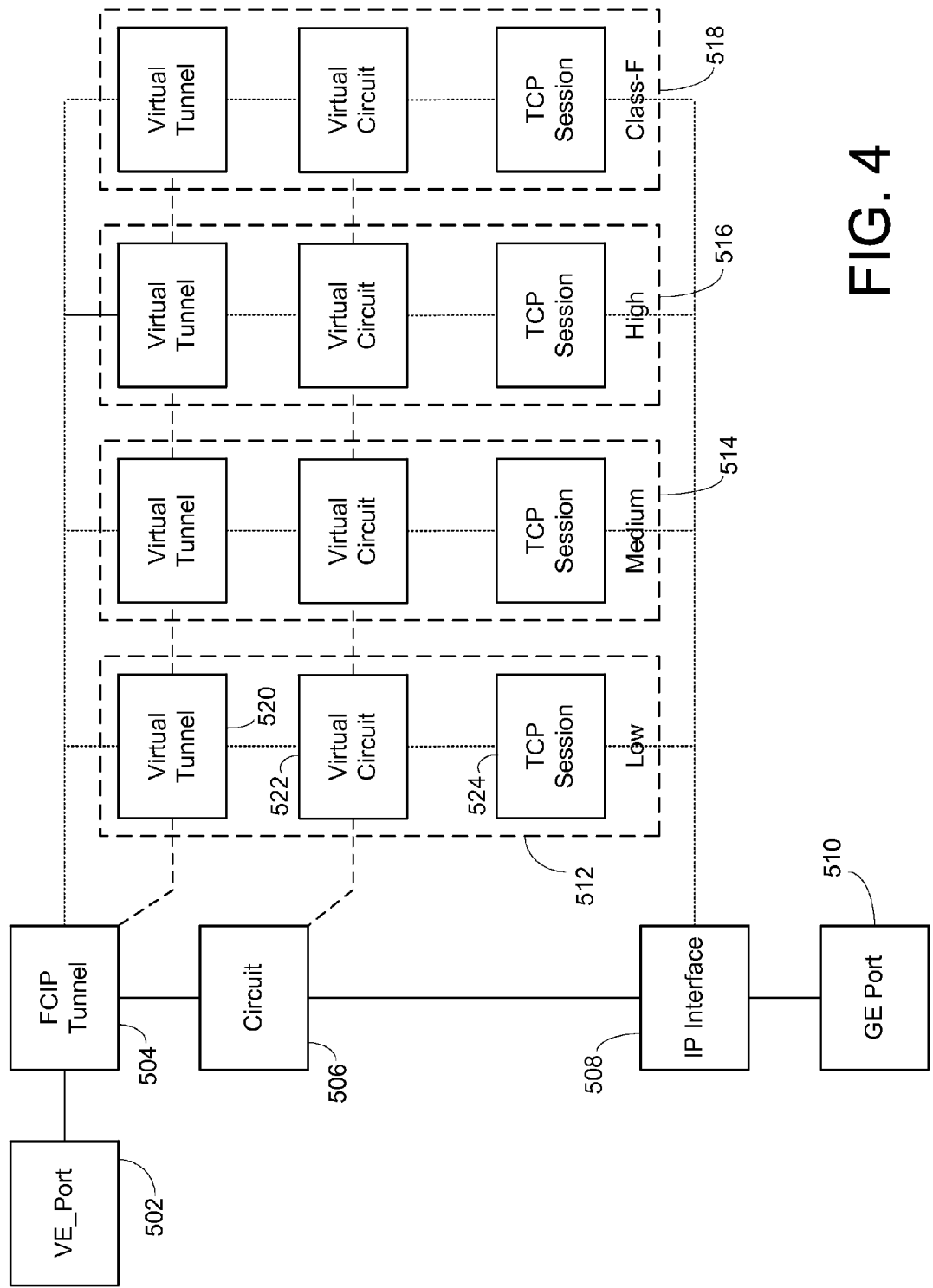
FIG. 4 illustrates the relationships between FCIP tunnels, circuits and TCP sessions.

FIG. 4 provides an alternative representation of the per priority TCP sessions within a single FCIP tunnel. A virtual E_PORT 502 is provided. An FCIP tunnel 504 is connected to the virtual E_PORT 502. The FCIP tunnel 504 is connected a circuit 506, which is connected to an IP interface 508, which is connected to a Gigabit Ethernet port 510. As discussed above, there are multiple streams low 512, medium 514, high 516 and class-F 518. Taking the low stream 512 as exemplary, each stream has a virtual tunnel 520 connected to a virtual circuit 522, which is connected to a TCP session 524. The TCP session 524 connects to the IP interface 508. Therefore, each priority can be considered as a virtual tunnel within the actual tunnel, with each virtual tunnel having a corresponding virtual circuit. If there are multiple circuits in the FCIP tunnel, then each virtual tunnel contains a like number of virtual circuits. This representation is extended below in the discussion of trunking, failover and load sharing.

Figure 5:
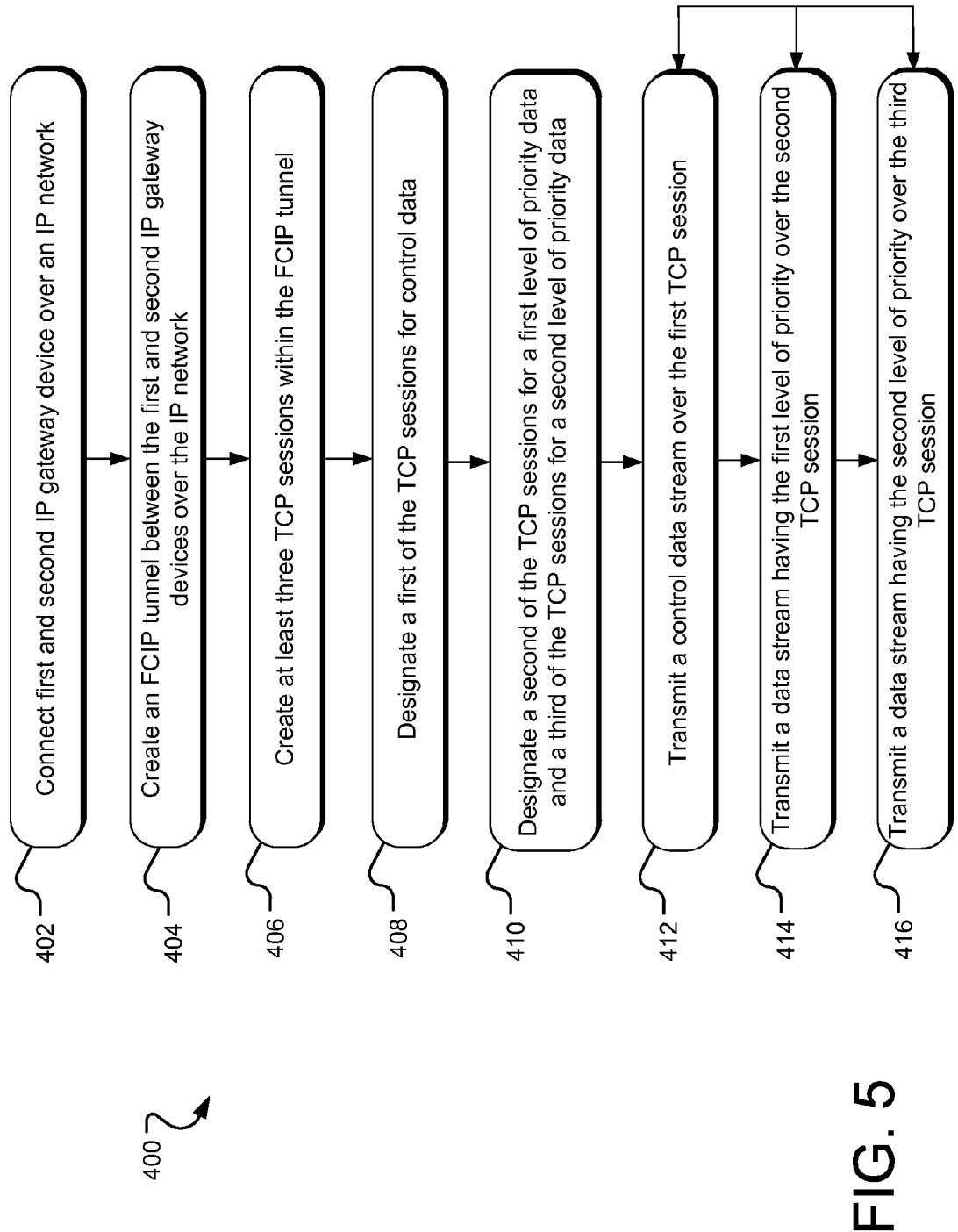
FIG. 5 illustrates example operations for communicating data having different levels of priority of service between a first FC network and a second FC network over an IP network.

FIG. 5 illustrates example operations for communicating data having different levels of priority of service between a first FC network and a second FC network over an IP network. A connecting operation 402 connects a first IP gateway device (e.g., an FCIP extension device, etc.) to a second IP gateway device over the IP network. Each IP gateway device supports its own FC network, which communicates across the IP network using an FCIP tunnel. It should also be understood that each IP gateway device may also support multiple FC networks, such as using Virtual Fabric (VF) technology.

A tunnel operation 404 initiates creation of the FCIP tunnel between the first and second IP gateway devices over the IP network. In one implementation, one of the IP gateway devices acts as a tunnel initiator and obtains an IP address. In many implementations, the source and destination IP addresses are manually configured at each end of the FCIP tunnel, although other designations of IP address are contemplated (e.g., allocation from an IP address service). The source IP address is that of the TCP/IP interface in the transmitting IP gateway device, and the destination IP address is that of the TCP/IP interface in the receiving IP gateway device. For example, the source and destination IP addresses may be retrieved from storage in the transmitting device. Typically, the destination address is learned by the transmitting device from a routing table or from a previously received frame and stored in association with the communication flow between the two devices.

The tunnel initiator then determines the IP address and the TCP port numbers of the remote IP gateway device on the other side of the tunnel. The FCIP tunnel parameters may be configured manually, discovered using Service Location Protocol Version 2 (SLPv2), or designated by other means. The tunnel initiator transmits an FCIP Special Frame (FSF) to the remote IP gateway device. The FSF contains the FC identifier and the FCIP endpoint identifier of the tunnel initiator, the FC identifier of the remote IP gateway device, and a 64-bit randomly selected number that uniquely identifies the FSF. The remote IP gateway device verifies that the contents of the FSF match its local configuration. If the FSF contents are acceptable, the unmodified FSF is echoed back to the tunnel initiator. After the tunnel initiator receives and verifies the FSF, the FCIP tunnel can carry encapsulated FC traffic.

A session operation 406 initiates creation of at least three TCP sessions within the FCIP tunnel. In one implementation, a three step handshake may be employed to create a TCP session. Before a session initiator attempts to establish a TCP session with a remote device, the remote device first binds to a port to open the port up for sessions (called a "passive open"). Once the passive open is established, the session initiator may initiate an active open to establish the TCP session:

The active open is performed by the session initiator by sending a SYN to the remote device.

In response, the remote device replies with a SYN-ACK.

Then, the session initiator sends an ACK back to the remote device.

At this point, both the session initiator and remote have received an acknowledgment of the session. The creation operation 406 may also include formation of an TCP trunk within the FCIP tunnel, with the TCP trunk including multiple FCIP circuits for each FCIP tunnel, each FCIP tunnel maintaining multiple TCP sessions for control and QoS of data.

A control operation 408 designates one of the TCP session for class-F control data. A data operation 410 designates one of the TCP sessions for a first priority of service (e.g., low) and another of the TCP session as a second priority of service (e.g., high). In a typical scenario, three different priorities of service are supported, but this typical scenario should not be limiting. Operations 408 and 410 may occur sequentially, concurrently, or in the order shown in FIG. 4.

Transmission operations 412, 414, and 416 can occur in any order or concurrently. The transmission operations 412, 414, and 416 designate the different priorities of data and the control data to different TCP sessions for transmission. For example, in one implementation, the transmission operations 412, 414, and 415 direct the data for the different priorities of data and the control data to the different TCP sessions. The transmission operation 412 then transmits a control data stream over the first TCP session, which is designated for class-F control data. The transmission operation 414 then transmits a data stream having a first level of priority of service (e.g., high) over the second TCP session. The transmission operation 416 then transmits a data stream having a second level of priority of service (e.g., low) over the third TCP session. Further, it would be typical to support at least a third level of priority of service (e.g., medium) over a fourth TCP session within the FCIP tunnel, although there is no requirement for three levels of priority.

FCIP trunking is a concept of virtualizing two or more circuits as part of a single FCIP tunnel. Multiple circuits can be ganged together to increase bandwidth. The tunnel is still a virtual E_PORT as presented to the Fibre Channel fabric, however, data will be directed to a particular circuit. Delivery of data is still guaranteed and in order. Each circuit is between the same pair of systems, though the circuits may or may not have the same set of attributes, such as IP addresses, bandwidth control, priority, etc. The circuits can be over the same or different physical Ethernet interfaces. FCIP tunnels and their associated circuits can share internal and external ports. FCIP trunking allows both load balancing and failover. Load balancing is a way of multiplexing data over multiple circuits. Failover is a way of diverting the traffic from one or more circuits (upon failure) to another circuit(s) without losing data and still guaranteeing order. Various types of algorithms such as, round-robin, spillover, and strict failover, can be used to provide either load balancing or failover or both.

A command line interface (CLI) is commonly used to administer the devices. For reference in the following description, selected CLI commands relating to the FCIP items described are provided here.

```
Usage: portcfg fciptunnel <ve-port> <create\modify\delete> [<parameters>]
    create parameters:
        <remoteIp> <localIp> <committedRate> [<optional args>]
        or
        <remoteIp> <localIp>    --min-comm-rate <kbps> --max-comm-rate
                                <kbps> [<optargs>]
    optional tunnel args:
        -f, --fastwrite              - turn fastwrite on
        -t, --tape-pipelining        - turn tape-pipelining on
        -N, --no-read-pipelining     - turn off tape read-pipelining
        -c, --compression <0-4>      - set compression mode (0=Off 1=Std
                                       2=Mod 3=Aggressive 4=Auto)
        -T, --tperf                  - turn TPerf Test Mode on
        -n, --remote-wwn <rem-wwn>   - specify remote switch WWN
        -d, --description <desc>     - A string description of the tunnel
        -i, --ipsec                  - Enable IPSec
        -K, --key <key>              - Specify preshared key (32 bytes)
        -q, --qos <high>,<med>,<low> - set QoS percentage for all priorities
        --qos-high <percentage>      - set QoS percentage for High priority
        --qos-med <percentage>       - set QoS percentage for Medium priority
        --qos-low <percentage>       - set QoS percentage for Low priority
    optional circuit args:
        -a, --admin-status <0\1>     - Disable/Enable the circuit
        -s, --sack- turn sack off
        -k, --keepalive-timeout <ms> - set the keepalive timeout in ms
        -x, --metric <metric>        - set the circuit metric
        -b, --min-comm-rate <kbps>   - set min comm rate value in kbps
        -B, --max-comm-rate <kbps>   - set max comm rate value in kbps
        -m, --min-retrans-time <ms>  - set min retrasmit time in ms
        -r, --max-retransmits <rtx>  - set maximum number of retransmits
        -v, --vlan-tagging <vlan-id> - set the vlan-id for the circuit
        --l2cos-f-class <l2cos>      - set the L2CoS value for F-Class Traffic
        --l2cos-high <l2cos>         - set the L2CoS value for High Priority
        --l2cos-medium <l2cos>       - set the L2CoS value for Medium Priority
        --l2cos-low <l2cos>          - set the L2CoS value for Low Priority
        --dscp-f-class <dscp>        - set the DSCP value for F-Class Traffic
        --dscp-high <dscp>           - set the DSCP value for High Priority
        --dscp-medium <dscp>         - set the DSCP value for Medium Priority
        --dscp-low <dscp>            - set the DSCP value for Low Priority
```

Examples:

```
Create tunnel 10;
    portcfg fciptunnel 10 create 192.168.10.1 192.168.20.2 1000000
Create a tunnel 10 without a circuit;
    portcfg fciptunnel 10 create
Usage: portcfg fcipcircuit <ve-port> <create\modify\delete> <circuitId>
    [<parameters>]
    create parameters:
        <remoteIp> <localIp> <committedRate> [<optional args>]
        or
        <remoteIp> <localIp> --min-comm-rate <kbps> --max-comm-rate
            <kbps> [<optargs>]
    optional circuit args:
        -a, --admin-status <0\1>     - Disable/Enable the circuit
        -s, --sack                   - turn sack off
        -k, --keepalive-timeout <ms> - set the keepalive timeout in ms
        -x, --metric <metric>          - set the circuit metric
        -b, --min-comm-rate <kbps>   - set min comm rate value in kbps
        -B, --max-comm-rate <kbps>   - set max comm rate value in kbps
        -m, --min-retrans-time <ms>  - set min retrasmit time in ms
        -r, --max-retransmits <rtx>    - set maximum number of
                                       retransmits
        -v, --vlan-tagging <vlan-id>   - set the vlan-id for the circuit
        --l2cos-f-class <l2cos>      - set the L2CoS value for F-Class Traffic
        --l2cos-high <l2cos>         - set the L2CoS value for High Priority
        --l2cos-medium <l2cos>       - set the L2CoS value for Medium
                                       Priority
        --l2cos-low <l2cos>          - set the L2CoS value for Low Priority
        --dscp-f-class <dscp>        - set the DSCP value for F-Class Traffic
        --dscp-high <dscp>           - set the DSCP value for High Priority
        --dscp-medium <dscp>         - set the DSCP value for Medium
                                       Priority
        --dscp-low <dscp>            - set the DSCP value for Low Priority
```

Examples:
Add circuit (as secondary) to tunnel. This circuit will be used as a backup only since the metric is lower than the initial circuit.
portcfgfcipcircuit 10 create 1 192.168.10.1 192.168.20.2 1000000-x 1
Modify the bandwidth of circuit 1 within tunnel 10:
portcfgfcipcircuit 10 modify 1-b 400000-B 600000
Modify the compression mode for tunnel 10:
portcfgfciptunnel 10 modify -c 1
Delete circuit number 2 from tunnel number 10:
portcfgfcipcircuit 10 delete 2

Figure 6:
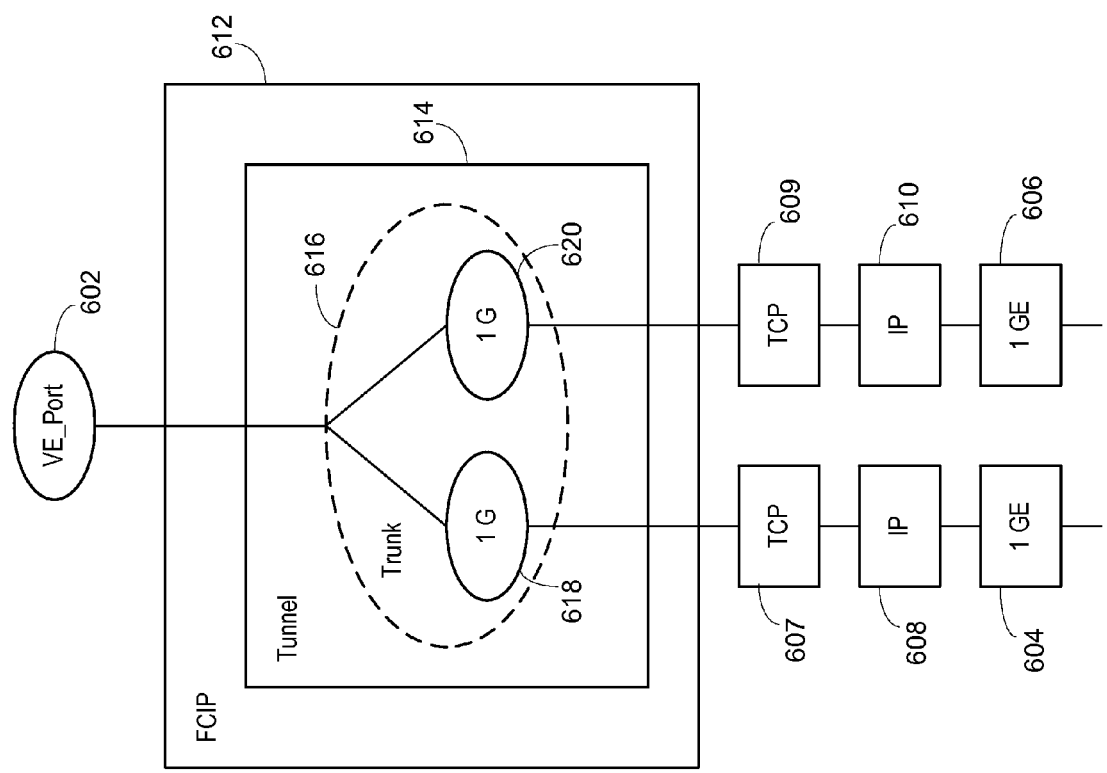

External or explicit FCIP trunking is the explicit configuring of multiple FCIP circuits within a tunnel, described by the functionality above. An administrator purposely creates another circuit to the same destination to provide extra bandwidth and/or redundancy. Most often this extra circuit(s) traverses a completely separate path to the remote due to load balancing performed by network components in the IP network. FIG. 6 provides an example. In this example a virtual E_PORT (VE_port) 602 is connected to the IP network through two Gigabit Ethernet (GE) ports 604, 606. The Ethernet ports 604, 606 have associated IP interfaces 608, 610 as the Ethernet ports 604, 606 each have different IP addresses to increase the probability of load balancing and failover. The FCIP system 612 connects the VE_port 602 to the two IP interfaces 608, 610. The FCIP system 612 provides an FCIP tunnel 614, which incorporates a trunk 616. The trunk 616 includes two virtual Gigabit circuits 618, 620, which are connected to the IP interfaces 608, 610. Thus a trunk is formed inside a tunnel and allows the use of multiple Ethernet ports and multiple IP addresses. It is noted that each circuit 618, 620 could utilize the above-described per priority TCP sessions and resultant virtual tunnels, but they have been omitted from FIG. 6 for clarity.

FCIP tunnel virtualization is the mechanism of internally creating additional "hidden" FCIP tunnels called Virtual Tunnels (VT). A VT will be created under the following conditions. First, if QoS is configured as described above, on a per class basis, e.g. high, medium, low, class-F. The same maximum bandwidth is available for each class. The minimum bandwidth available for each class is based on QoS configuration percentages. In the preferred embodiment QoS is preserved within the IP/Ethernet network by mapping the priority to a DiffServ/L2CoS value before being sent over the Ethernet ports. In this case, the virtual tunnels are generally given different TCP values over the same IP address, as described above. Second, if the configured, committed rate of the tunnel is greater than a configured maximum, an additional set of virtualized tunnels are created for each priority. A default maximum can be 2 Gbps. For example, if the committed rate is 10 Gbps and the VT maximum is 2 Gbps, then 5 VTs will be built for each priority class plus one class-F VT, for a total of 16 VTs. Because of the volume of class-F traffic is low, multiple VTs are not built for class-F, as just the single VT is sufficient. In this case, the VTs for each priority class would generally receive different TCP values as described above. Third, if the MinVT exceeds the actual MaxVT, but not configured MaxVT, additional VEs are created as needed and ISL trunking is necessary.

Traffic is sent to the specified VT based on the user/application design, e.g. an FC exchange. Each virtual tunnel maintains its own data ordering. Except for the priority class attributes, each VT is created with the same attributes as the configured (original) tunnel. Any modifications to the tunnel modify all VTs, including tunnels configured with multiple FCIP circuits (trunking) FIG. 8 provides an example. In FIG. 8, the tunnel 818 contains two VTs 828 and 830, assuming only two priority levels as indicated by the switch policy/QoS 836 for the FC network. Each VT 828 and 830 contains a 1 Gbps circuit 832, 834, which are connected to TCP sessions 836, 838, respectively. The two TCP sessions, 836, 838 connect to a single IP interface 840, which is connected to the GE interface 804.

Figure 7:
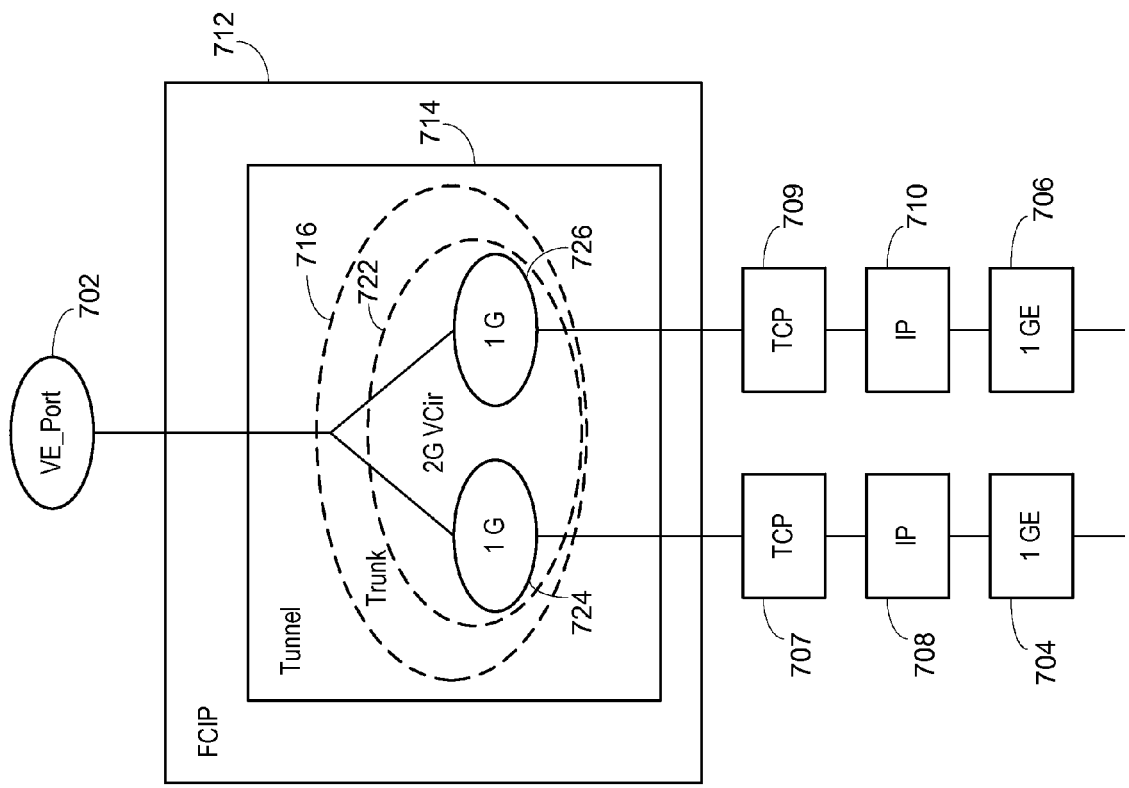

FCIP circuit virtualization (or internal FCIP trunking) is the automatic and transparent creation of multiple circuits used to indicate the relevant TCP sessions. These circuits are collectively called a virtual circuit (VCir). A VCir instance is created under each VT for each circuit explicitly created in the tunnel. Thus, if only one circuit has been requested, only one VCir instance is created under each VT, each collectively being the VCirs for that circuit, referred to as a VCir group in this description. If two circuits have been requested, then two VCir instances are created under each VT, there then being two VCir groups. Bandwidth is split evenly between all circuits and interfaces. Round-robin load balancing is performed between all circuits. The virtual circuit(s) are not independently configurable; they are a mirror of the original or configured circuit. Externally/administratively the VCirs of a group collectively appear as a single circuit. Any modifications to the configured circuit modify the virtual circuit. The "circuit" will not become active until all associated circuits are active. Likewise, failover is not performed between these internal circuits. If one fails, the "circuit" will appear as failed. Internal trunking is independent of explicit trunking. Each VCir group will be assigned different IP addresses due to the use of different actual circuits and interfaces. FIG. 7 provides an example. In FIG. 7, elements similar to those in FIG. 6 are numbered similarly except for the change in the leading digit. In the configuration of FIG. 7, a 2 Gbps VCir 722 is provided inside the trunk 716. The VCir 722 includes two 1 Gbps circuits 724 and 726. In this manner the requested 2 Gbps of bandwidth is provided transparently. FIG. 7 does not include any VTs as priority operation is not illustrated.

FIGS. 9-24 are examples of some common FCIP tunnel configurations. Three priority classes are used, High, Low and class-F in the figures for clarity, it being understood that a different number of priority classes can be used if desired. The hatched arrow elements are the active circuits being used, the cross-hatched arrow elements are circuits that have failed and the non-hatched arrow elements are not active and are used as standbys. User(s) are shown in the first example of FIG. 9 but otherwise just the FCIP tunnel/trunk/circuit objects are provided. Each Virtual Tunnel depicted represents a unique and independent VT, e.g. VT0-high, and VT0-low, are two independent VTs. A three part addressing scheme creates a unique VT ID, based on VE_port, VT number and priority. Virtual circuits are then developed from each VT as necessary. Adaptive rate limiting is applied to each virtual circuit. The MinRate of all VCirs over a physical port cannot exceed the ports actual limit. A MaxRate will always apply, even if the user did not request one. The internal MinRate/MaxRate limits applied may vary from that which was specified by the user to accommodate the multiple VTs created. In the following examples, a 60/40 split of bandwidth is used between High/Low VTs respectively, with class-F VTs being the highest priority. If a range is depicted, e.g. 100-200 Mbps, the first number is the MinRate applied to the VCir and the second number is the MaxRate. If a single number is depicted, the number is both the MinRate and the MaxRate. The class-F rate is unrestricted in this aspect in the preferred embodiment and is not used in calculating the rates on other circuits, though this is represented in the Figures by using the maximum tunnel bandwidth for the class-F VT rate.

FIGS. 9-17 are examples utilizing GE ports, while FIGS. 18-24 are examples using 10 GE ports.

Figure 9:
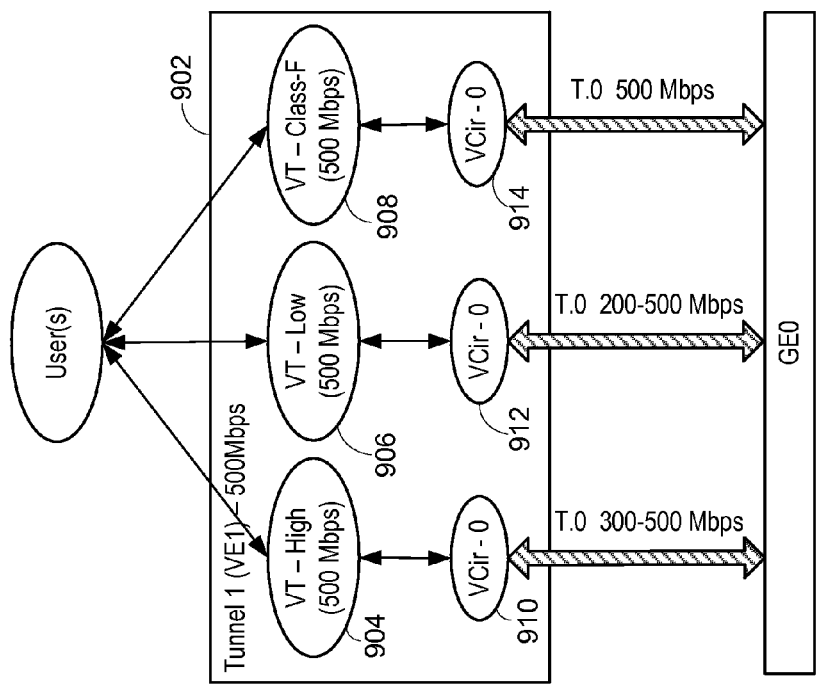

FIG. 9 illustrates a single tunnel with a committed rate of 500 Mbps and a 1 Gbps port and three priority classes. This is developed in the preferred embodiment by using a command such as:

portcfg fciptunnel 1 create 192.168.10.1 192.168.20.1 500000

This results in the creation of tunnel number 1 902 with a circuit that is numbered 0, as the fciptunnel command creates an implied circuit 0 when a circuit is created. IP address 192.168.20.1 corresponds to port GE0, which was associated via a portcfg ipif create command. IP address 192.168.10.1 corresponds to the IP address of the other end of the FCIP link. Three VTs 904, 906, 908 are created for the tunnel 902. The VCirs 910, 912 and 914 are created under the three VTs 904, 906, 908. Each of these VCirs have a single TCP session in the preferred embodiment as indicated by the single arrows and T values under the VCirs. The 60/40 bandwidth split is indicated by the MinRate values of 300 Mbps and 200 Mbps for VT-High T.0 and VT-Low T.0, respectively. The MaxRate value of 500 Mbps is applied to each TCP session. The VCir 914 associated with the class-F VT 908, VT-class-F T.0, has an indicated bandwidth of 500 Mbps as the class-F VT is always assumed to operate at the circuit maximum and not utilized in the MinRate and MaxRate calculations. This example is a sample of per priority TCP QoS discussed above.

Figure 10:
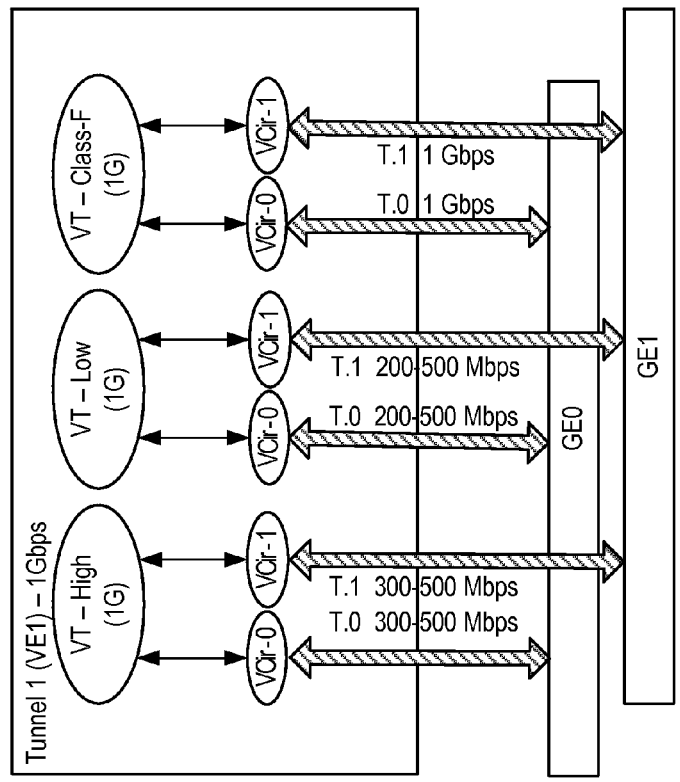

FIG. 10 illustrates two circuits with committed rates of 500 Mbps on each over 1 Gbps ports, with round-robin load balancing. The exemplary commands are:

portcfg fciptunnel 1 create 192.168.10.1 192.168.20.1 500000 portcfgfcipcircuit 1 create 1 192.168.10.2 192.168.20.2 500000

The value after the create parameter in the fcipcircuit command is the new circuit number, the 0 value having been developed with the fciptunnel command. Each of the circuits on each VT is active and load balanced. Two VCirs, VCir-0 and VCir-1, are created under each VT to match the two circuits defined for the tunnel. In the preferred embodiment TCP values are developed using conventional methods and provided to the representative VCirs as they are formed. The TCP values are assigned independent of any IP addresses. Each TCP session group has an IP address. In the example, the T.0 sessions have one IP address and the T.1 sessions have a different IP address, while the VT-High VT.0, VT-High T.1, VT-Low T.0, VT-Low T.1, VT-Class-F T.0 and VT-Class-F T.1 TCP sessions each have different TCP values.

Figure 11:
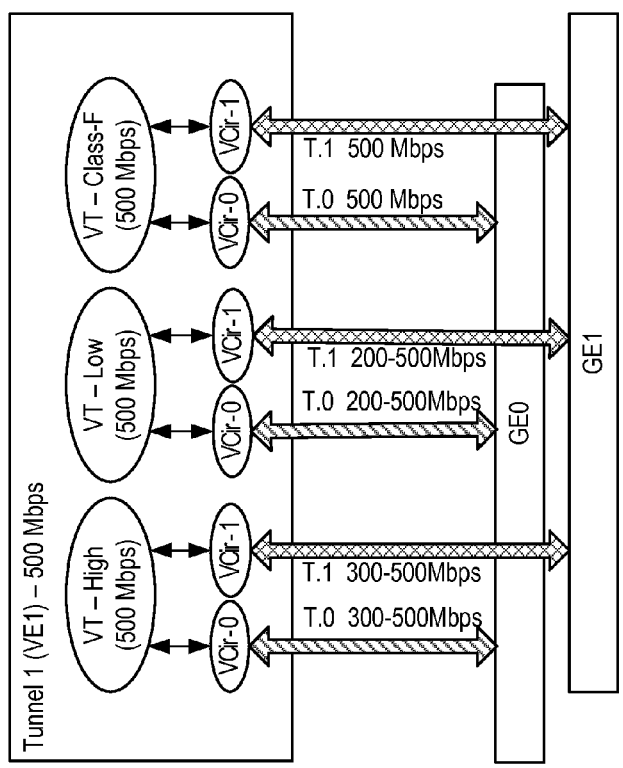

FIG. 11 illustrates the reconfiguration of the tunnel of FIG. 10 after a failure on GE1, for example. The Max tunnel rate would go from 1 Gbps to 500 Mbps as indicated in the VT elements.

Figure 12:
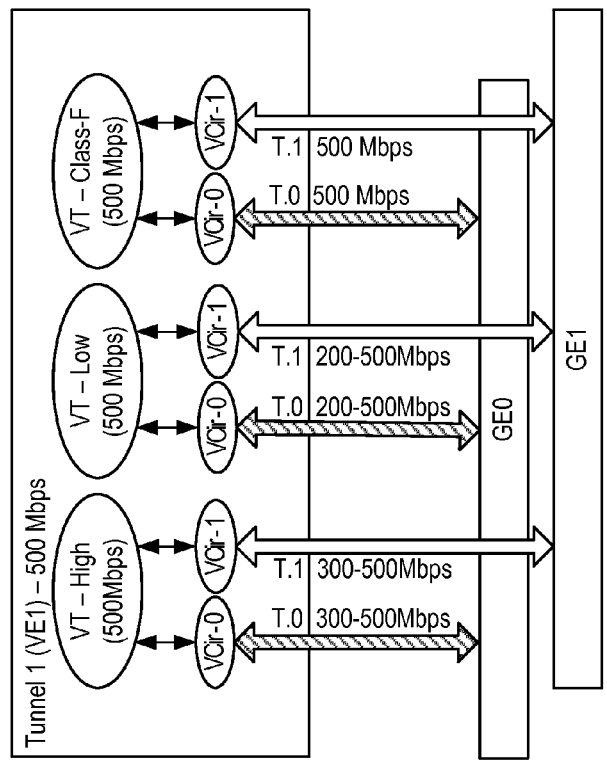

FIG. 12 illustrates two circuits with committed rates of 500 Mpbs on each over 1 Gbps ports, with failover only being applied. The preferred and commands are:

portcfgfciptunnel 1 create 192.168.10.1 192.168.20.1 500000-x 0 portcfgfcipcircuit 1 create 1 192.168.10.2 192.168.20.2 500000-x 1

The -x 0 and -x 1 indicate the active and standby settings. In the preferred embodiment, the standby circuits are in an active standby mode to improve failover performance.

Figure 13:
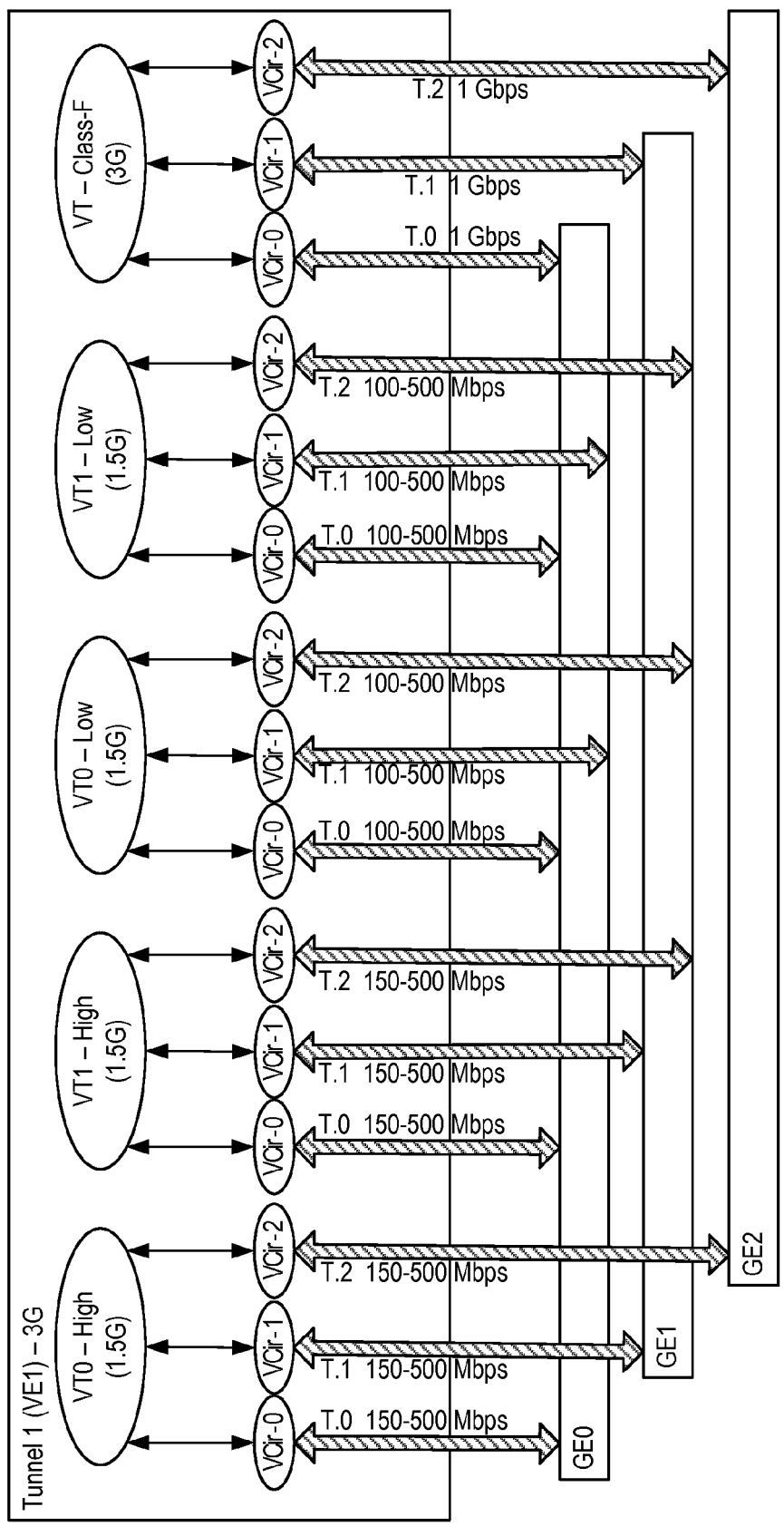

FIG. 13 illustrates a single tunnel with a committed rate of 3 Gbps over 1 Gbps ports. The exemplary commands are:

portcfgfciptunnel 1 create 192.168.10.1 192.168.20.1-b 500000-B 1000000 portcfgfcipcircuit 1 create 1 192.168.10.2 192.168.20.2-b 500000-B 1000000 portcfgfcipcircuit 1 create 2 192.168.10.3 192.168.20.3-b 500000-B 1000000

Two VTs in the data priorities are created, each at 1.5 Gbps. Each VT has three VCirs, one to each GE port which represent the three circuits requested. The sum of the MinRate values for the TCP sessions of each VCir of each VT equals the committed MinRate values specified. For example, the sum of the T.0 VCirs MinRate values is 500 Mbps, as committed. The split between VT0-High T.0 and VT1-High T.0 provides the 60% provided to the high priority in these examples when compared to the VT0-Low T.0 and VT1-Low T.0 values. Each of the TCP sessions of the VCirs of the data VTs has a MaxRate value of 500 Mbps, so that VT0-High T.0 and VT1-High T.0 total the committed MaxRate of 1 Gbps. Similarly, VT0-Low T.0 and VT1-Low T.0 total the committed MaxRate of 1 Gbps. The rate of each VT is computed by summing the MaxRate values for each TCP session of that VT. For example, VT0-High has a rate of 1.5 Gbps based on the three MaxRate values of 500 Mbps. The Class-F VT has a rate of 3 Gbps based on the three 1 Gbps TCP session values. As above, each VCir group has a different IP address. The different VTs, such as VT0 and VT1, could utilize different IP addresses on the same GE port, but the preferred embodiment has all T.0 circuits on the same IP address.

Figure 14:
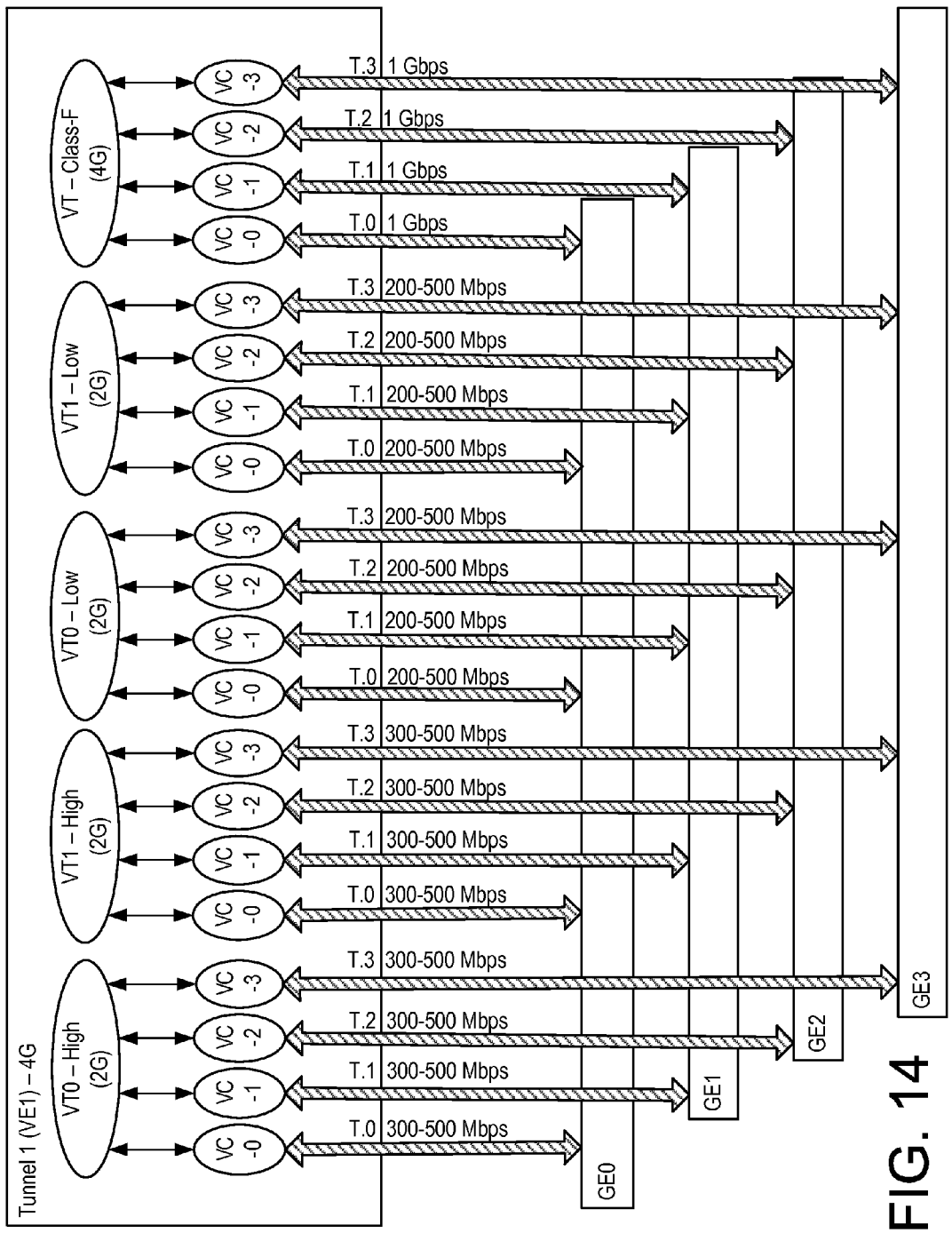

FIG. 14 illustrates a single tunnel with a committed rate of 4 Gbps over 1 Gbps ports. The exemplary commands are:

portcfgfciptunnel 1 create 192.168.10.1 192.168.20.1 1000000 portcfgfcipcircuit 1 create 1 192.168.10.2 192.168.20.2 1000000 portcfgfcipcircuit 1 create 2 192.168.10.3 192.168.20.3 1000000 portcfgfcipcircuit 1 create 3 192.168.10.4 192.168.20.4 1000000

Failover is present on all of the circuits. The per TCP session, and in this example per VCir, MaxRate is 500 Mbps, so that the two VTs of a priority level that aggregate over any one interface still have 1 Gbps available. The sum of the MinRate values of the like VCirs in the data VTs is the committed MinRate of 1 Gbps, with the 60/40 split developed between the High and Low priority VTs.

Figure 15:
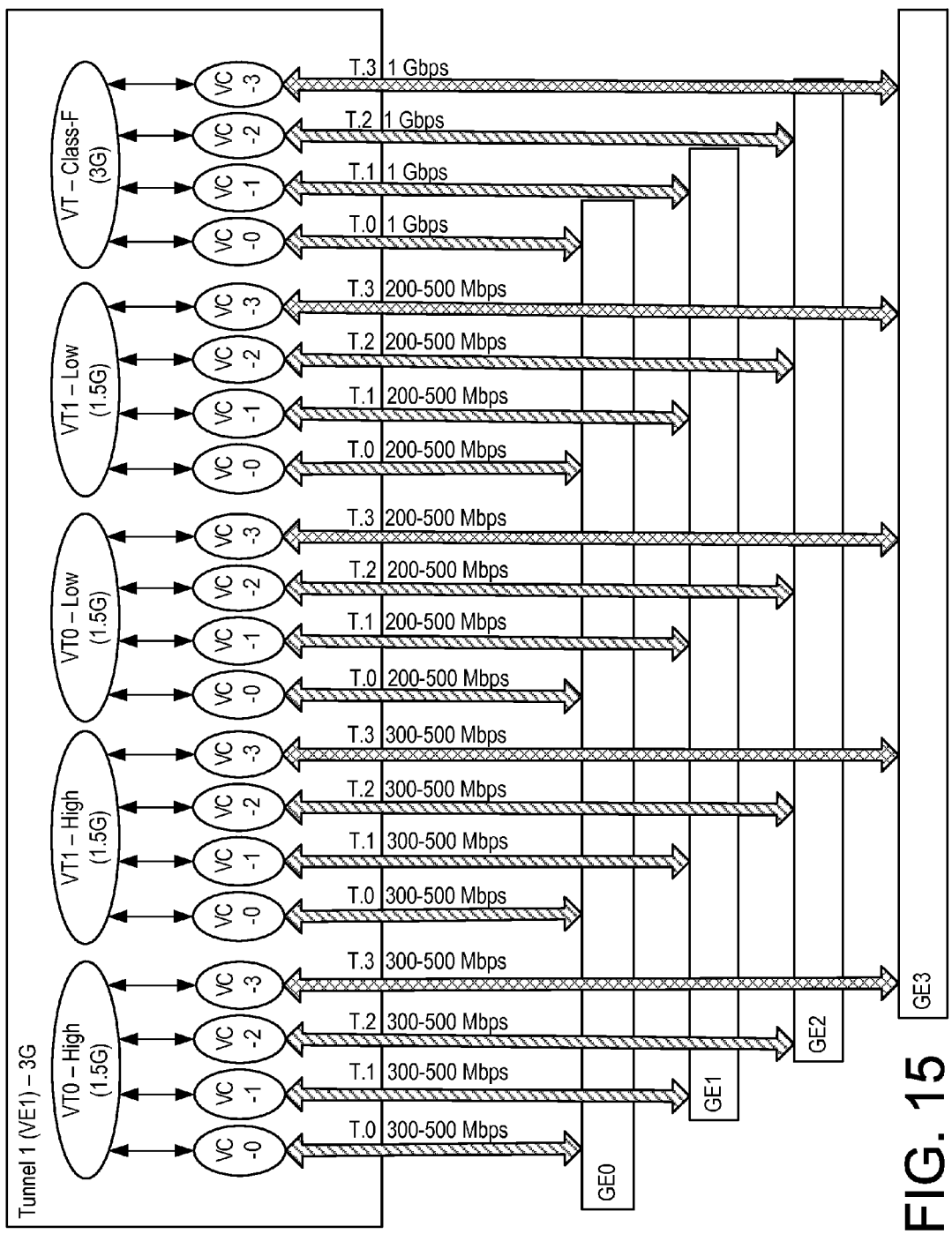

FIG. 15 illustrates the reconfiguration of the tunnel of FIG. 14 after a failure on GE3, for example. Note that the Max for the tunnel is 3 Gbps and the aggregate of the each class of VTs is the same 3 Gbps. This represents the potential high for each VT, not the guaranteed rate for each VT. The downed circuit will try to re-establish itself, and once re-established, the rate limiting on each VCir will revert to that which is depicted in FIG. 14 above.

Figure 16:
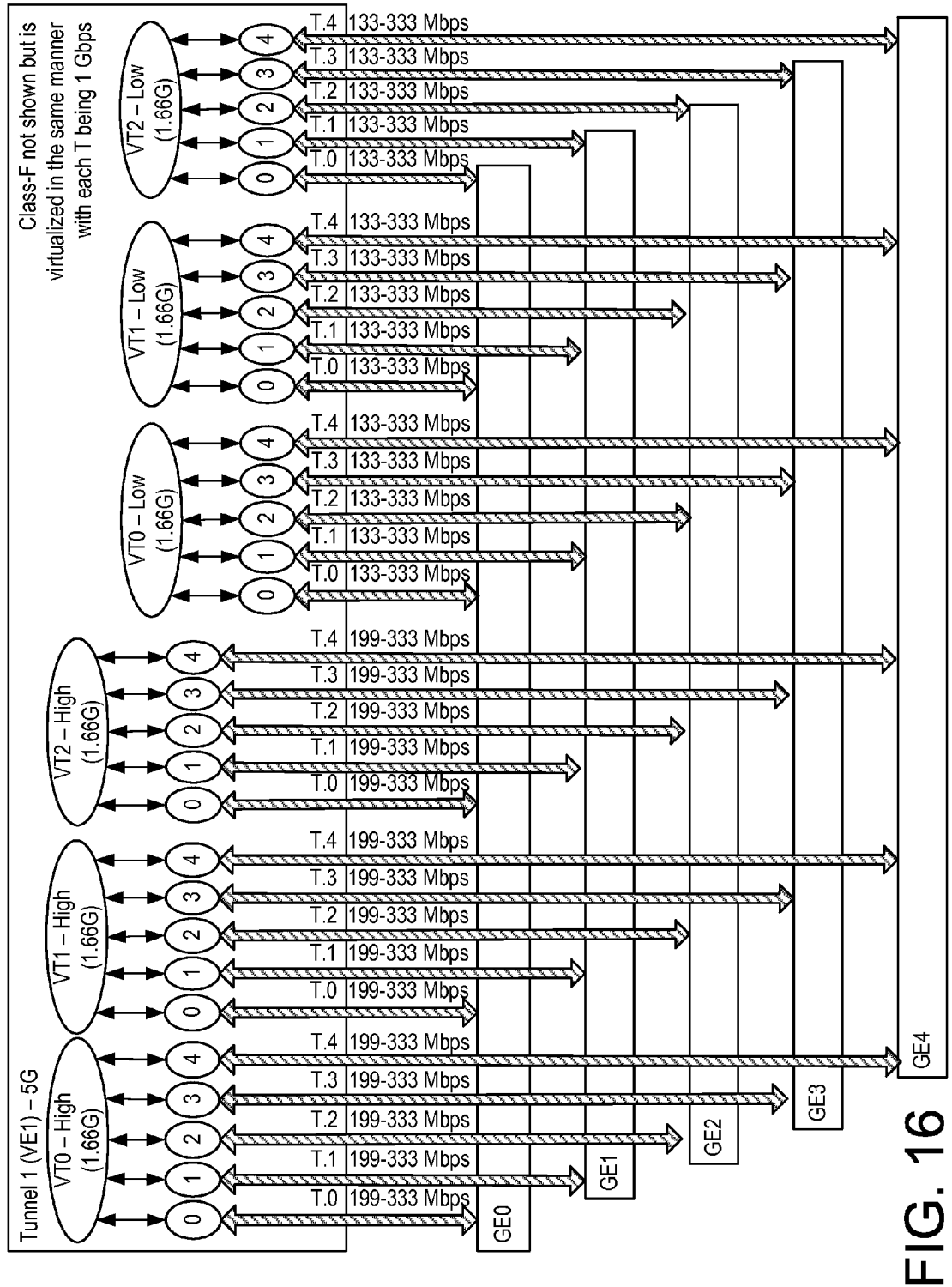

FIG. 16 illustrates a tunnel with committed rates of 5 Gbps over 1 Gbps ports. The preferred commands are:

portcfgfciptunnel 1 create 192.168.10.1 192.168.20.1 1000000 portcfgfcipcircuit 1 create 1 192.168.10.2 192.168.20.2 1000000 portcfgfcipcircuit 1 create 2 192.168.10.3 192.168.20.3 1000000 portcfgfcipcircuit 1 create 3 192.168.10.4 192.168.20.4 1000000 portcfgfcipcircuit 1 create 4 192.168.10.5 192.168.20.5 1000000

The data VTs are split into three 1.66 Gbps VTs in two priorities, with all VCirs or TCP sessions balanced over five 333 Mbps TCP sessions. The Low priority VT VCirs or TCP sessions have a MinRate value of 133 Mbps, while the High priority VT VCirs or TCP sessions have a MinRate of 199 Mbps.

Figure 17:
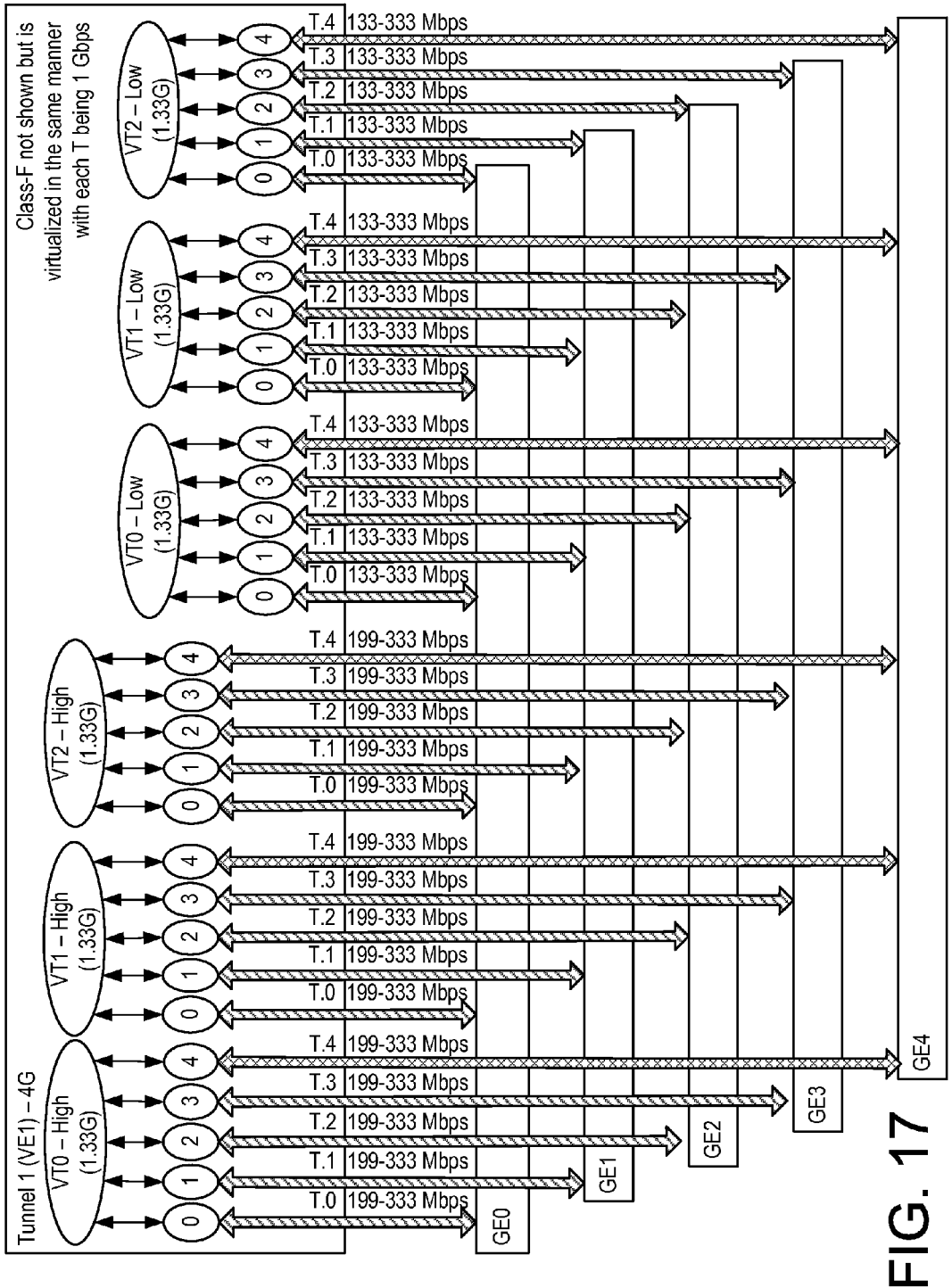

FIG. 17 illustrates the reconfiguration of the tunnel of FIG. 16 after a failure on GE4, for example. The rate of each data VT is reduced to 1.33 Gbps. The downed circuit will try to re-establish itself. Once re-established, the rate on each VT will revert to that which is depicted in FIG. 16.

In the preferred embodiment, the Ethernet ports can be 10 Gbps ports externally but for design reasons internal circuits are set at 1 Gbps, with ten 1 Gbps circuits thus developing the Gbps port. It is noted that in the preferred embodiment the 10 Gbps port will have multiple IP addresses, though the tunnel definition can indicate the use of a single IP address if desired. The 1 Gbps ports may have multiple IP addresses as well, but have been illustrated as having single IP addresses for clarity. Further, while the examples of FIGS. 9-17 had only single TCP sessions under each VCir, when 10 Gbps ports are used, multiple TCP sessions can be assigned to a single VCir due to the internal design of the preferred embodiment as discussed above, with each TCP session being related to internal 1 Gbps circuits.

Figure 18:
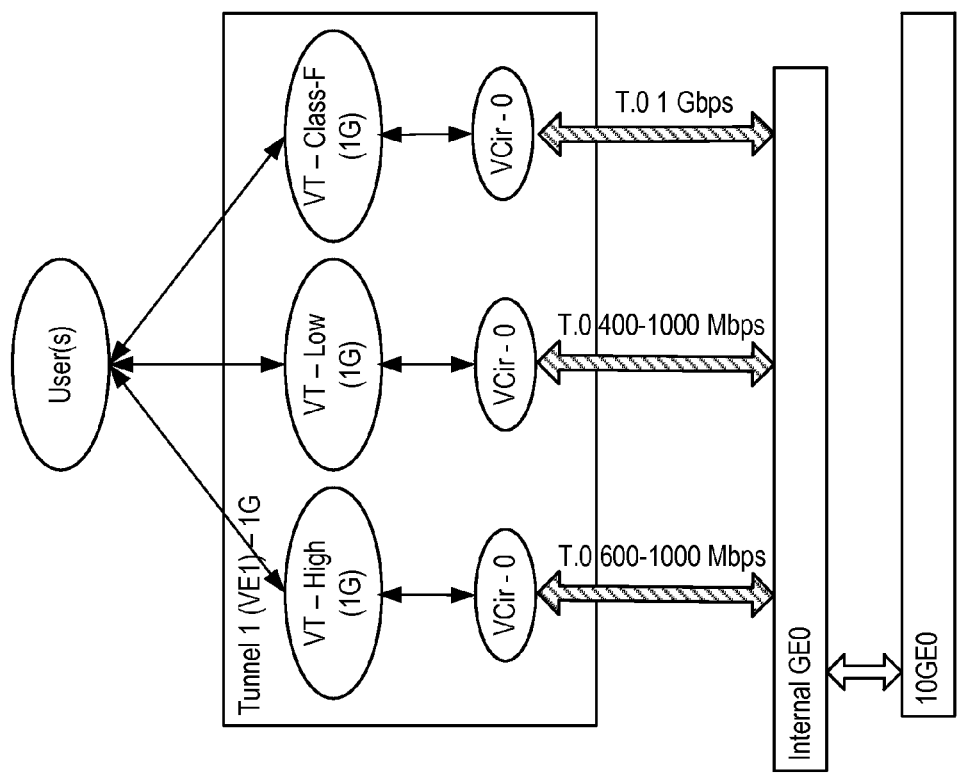

FIG. 18 illustrates a single tunnel with committed rate of 1 Gbps over a 10 Gbps port. The command is:
    portcfg fciptunnel 1 create 192.168.10.1 192.168.20.1 1000000

This command creates tunnel number 1 with a circuit that is numbered 0. With QoS active, three VTs are always created for each tunnel in the example, as only two priorities plus class-F are used in these examples for clarity. If more priorities are used, more VTs are created for each tunnel. One VCir is created under each VT, with one TCP session per VCir.

Figure 19:
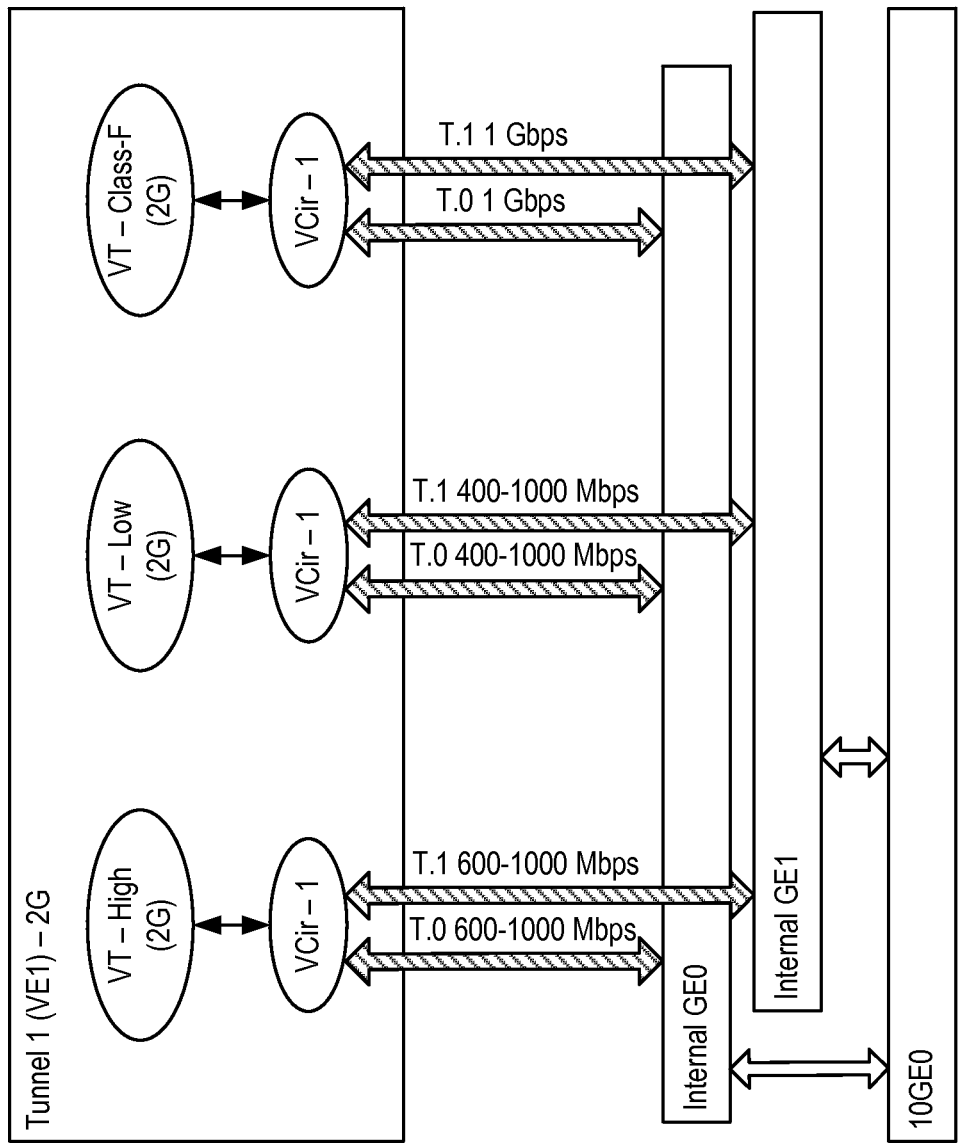

FIG. 19 illustrates a single tunnel with a committed rate of 2 Gbps over a 10 Gbps port. The exemplary command is:
    portcfg fciptunnel 1 create 192.168.10.1 192.168.20.1 2000000

This configuration will automatically invoke two TCP sessions per VCir since the maximum bandwidth for a circuit is 1 Gbps due to internal design factors as noted above. Each of the circuits is created over separate internal GE circuits/ports and the bandwidth is split evenly between the circuits. As illustrated, the VTs and VCirs work together to provide a single transport load-balancing layer. Even though there are two internal circuits, externally there is only one circuit and one IP address as specified in the command. Six TCP sessions are used, but all will utilize the indicated IP address.

Figure 20:
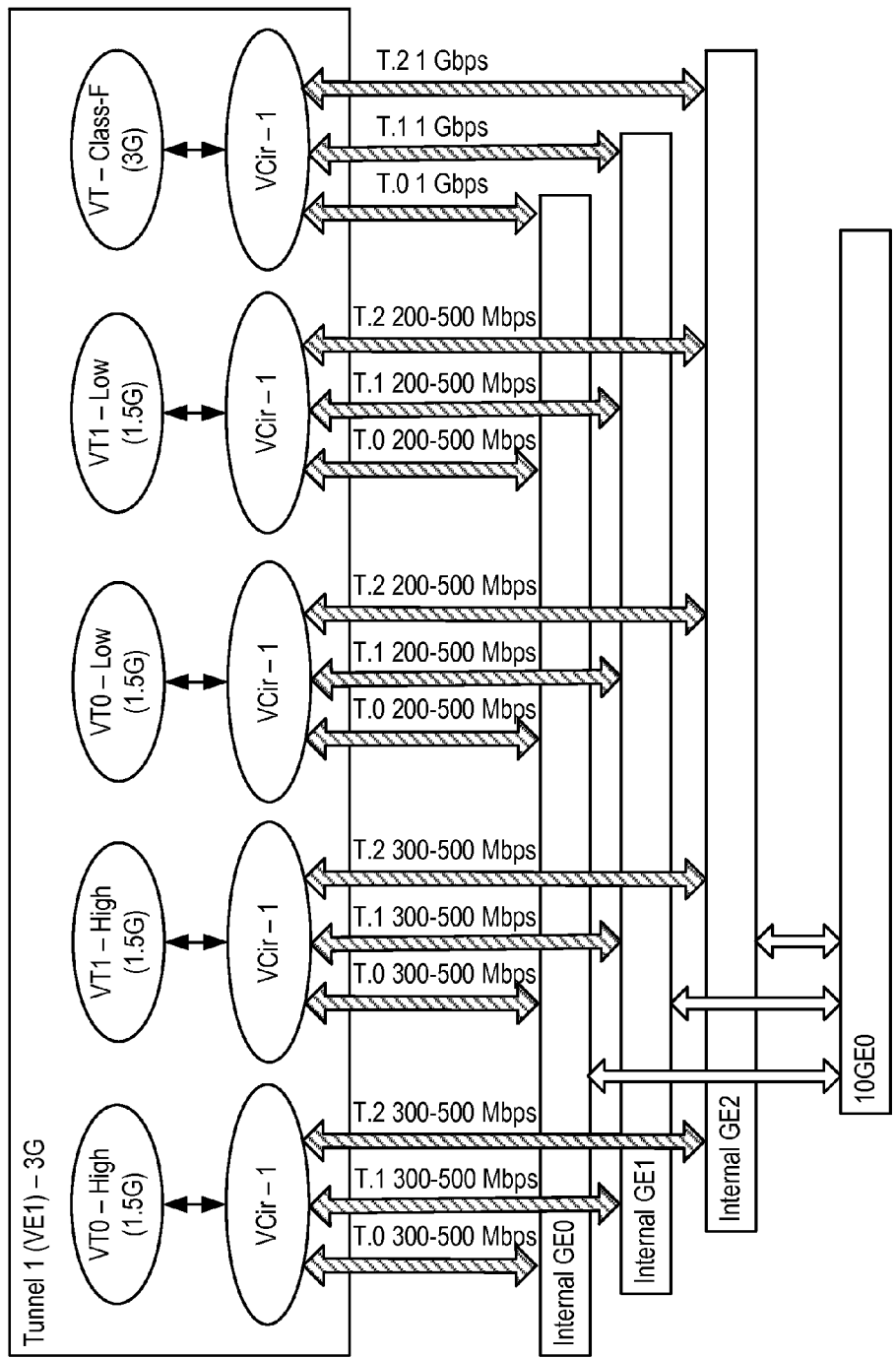

FIG. 20 illustrates a single tunnel with a committed rate of 3 Gbps over a 10 Gbps port. The command is:
    portcfg fciptunnel 1 create 192.168.10.1 192.168.20.1 3000000

The 3 Gbps request invokes two VTs for the data priorities, each having a rate of 1.5 Gbps. Thus FIG. 20 is similar to FIG. 13 in that respect. In FIG. 20, only a single VCir is created under each VT, with each VCir having three TCP sessions, as indicated by the three arrows or T groups. This differs from FIG. 13 as the 3 Gbps can be provided from the single interface and only one circuit is requested, whereas FIG. 13 needed three interfaces and three circuits were requested. Both FIG. 13 and FIG. 20 end up with the same number of TCP sessions, just a different number of VCirs due to the specified number of circuits and the capability of the physical connection to carry the full requested bandwidth.

Figure 21:
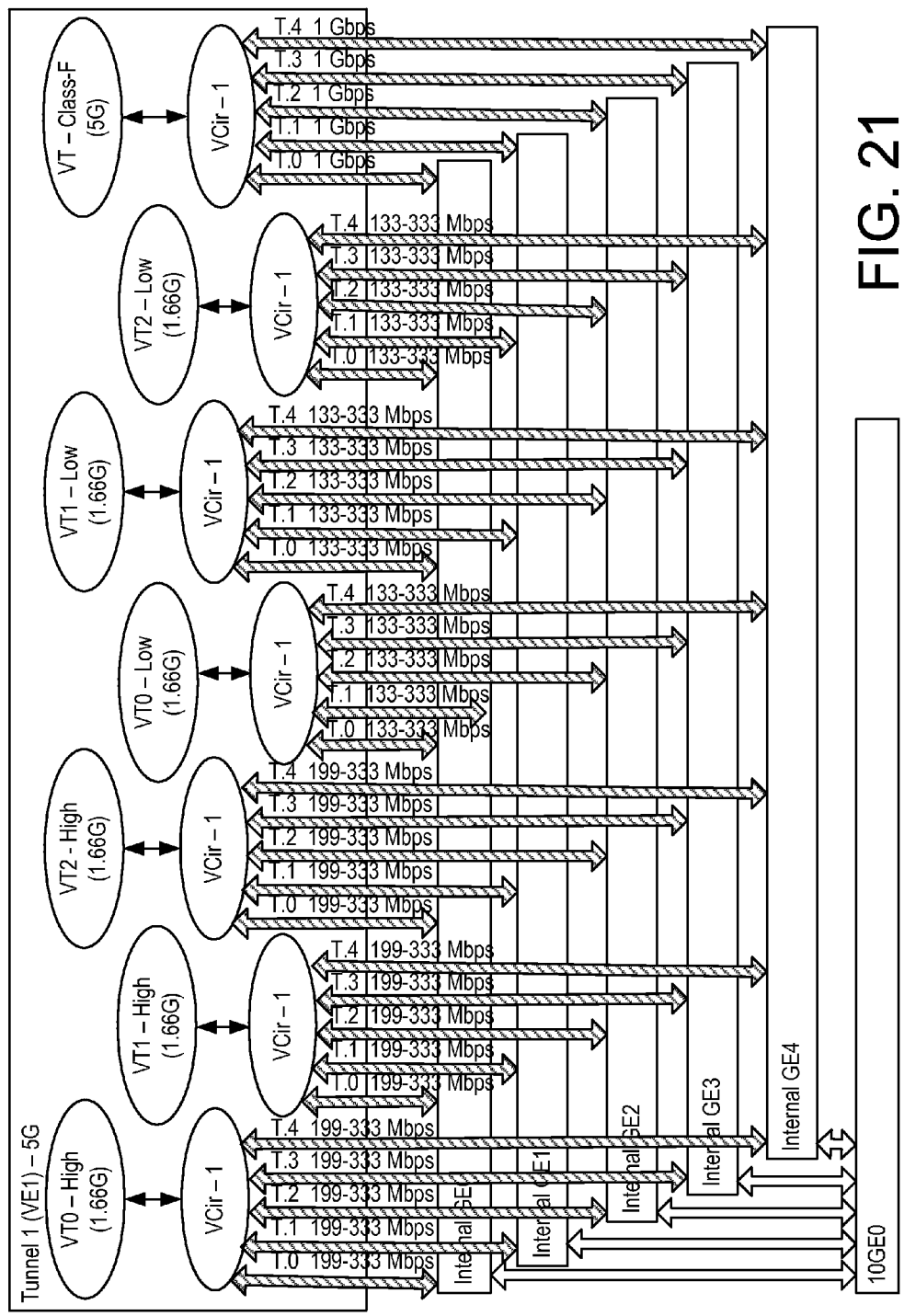

FIG. 21 illustrates a single tunnel with a committed rate of 5 Gbps over a 10 Gbps port. The command is:
    portcfg fciptunnel 1 create 192.168.10.1 192.168.20.1 5000000

The 5 Gbps request invokes three VTs in each data priority. VCirs with multiple TCP sessions are also invoked as a result due to the 1 Gbps limitation and the need to balance circuits over the VTs. The cumulative MinRates for the data VT T.0 TCP sessions is 1 Gbps as requested, and the sum of the MaxRates for the High and Low VTs T.0 TCP sessions is also 1 Gbps due to port constraints.

Figure 22:
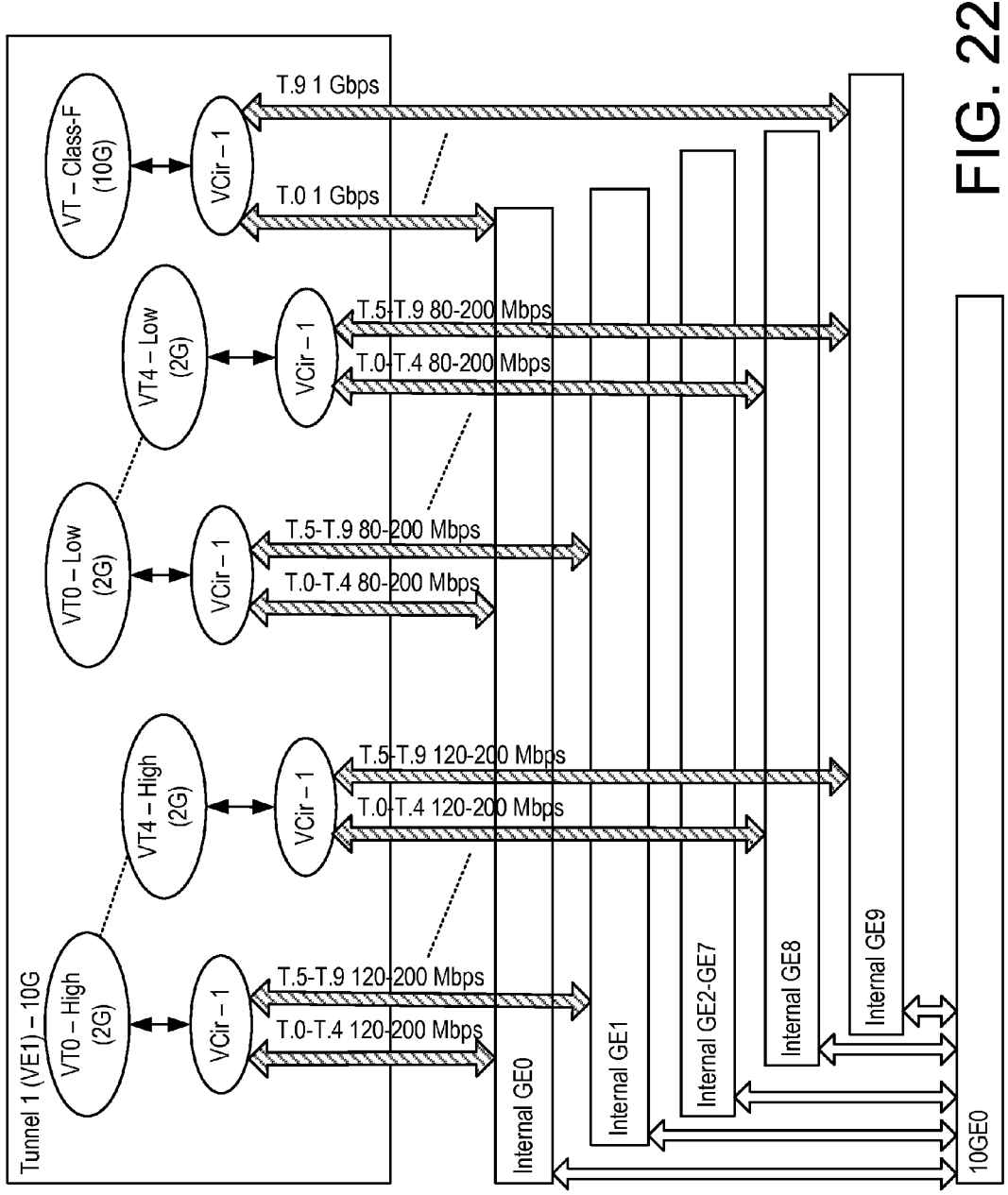

FIG. 22 illustrates a single tunnel with a committed rate of 10 Gbps over a 10 Gbps port. The command is:
    portcfg fciptunnel 1 create 192.168.10.1 192.168.20.1 10000000

This configuration invokes multiple virtual tunnels in the preferred embodiment since the maximum bandwidth for a VT is 2 Gbps. It also invokes virtual circuits for trunking since the maximum bandwidth for a TCP session is 1 Gbps in the preferred embodiment. This configuration will create 50 TCP sessions. Each of the 10 TCP sessions associated with each data priority VT will map to two separate internal GE circuits, while the 10 TCP sessions of the class-F VT each go to a separate internal GE circuit.

Figure 23:
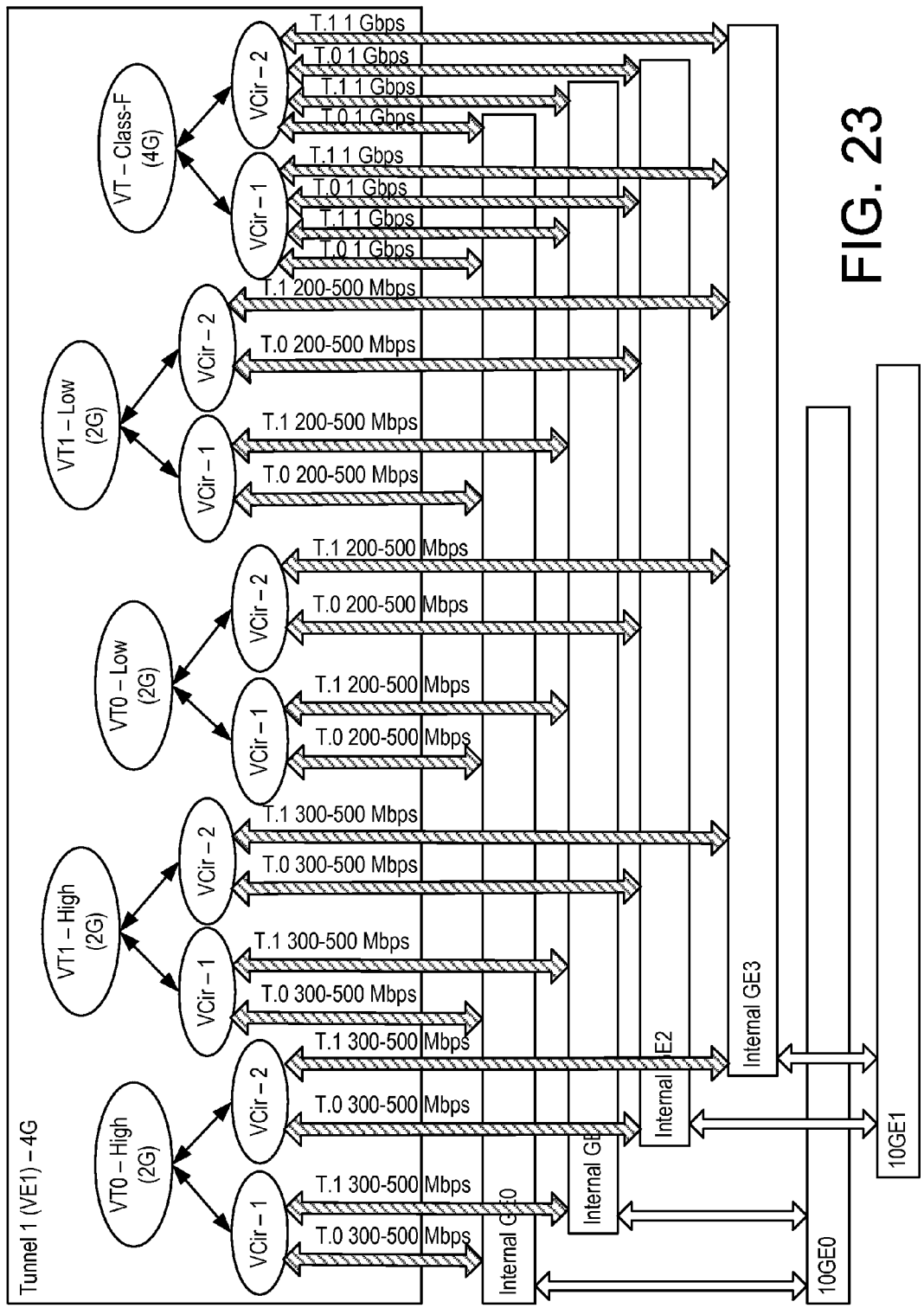

FIG. 23 illustrates two physical 10 GE circuits with a committed rate of 2 Gbps on each over the 10 Gbps ports, with round-robin load balancing. The commands are:
    portcfg fciptunnel 1 create 192.168.10.1 192.168.20.1 2000000
    portcfg fcipcircuit 1 create 1 192.168.10.2 192.168.20.2 2000000

Since the total bandwidth requested is more than the configured or default 2 Gbps per VT, a second virtual tunnel is built for each data priority. Two virtual circuits are created for each VT to match the number of requested circuits as well to allow the load balancing while conforming to the 1 Gbps internal maximum value. The TCP sessions of the VCirs on the High VTs have MinRate values of 300 Mbps and MaxRate values of 500 Mbps, while the Low VT TCP sessions have MinRate values of 200 Mbps to conform to the 60/40 balance. Each of the tunnels will round-robin load balance on each VT over two 1 Gbps circuits. The two VTs times the two 1 Gbps circuits gives the desired load-balancing/failover with 4 Gbps of throughput for the applications.

Figure 24:
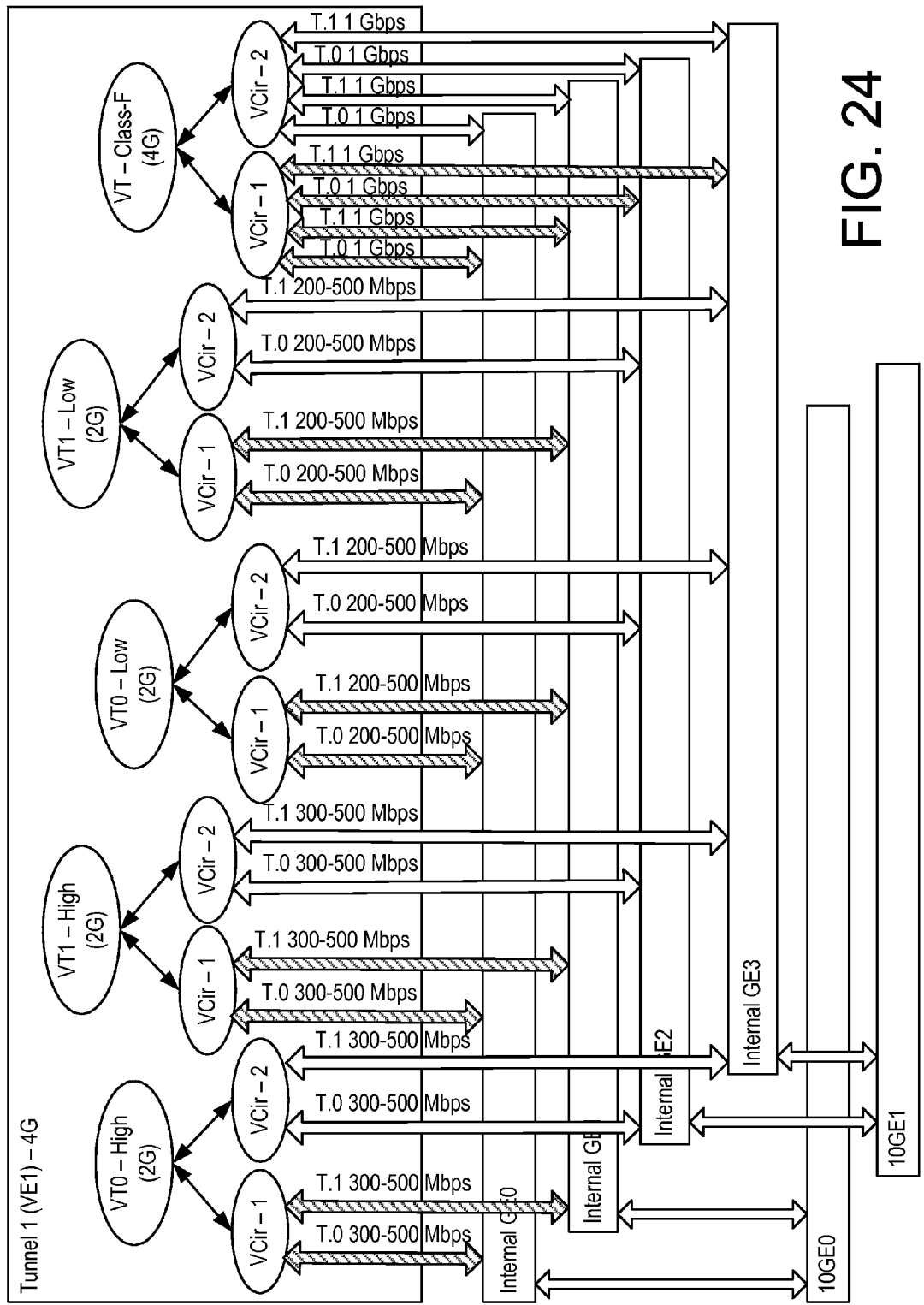

FIG. 24 illustrates the same configuration as FIG. 23 but with failover-only instead of round-robin load balancing. The commands are:
    portcfg fciptunnel 1 create 192.168.10.1 192.168.20.1 2000000-x 0
    portcfg fcipcircuit 1 create 1 192.168.10.2 192.168.20.2 2000000-x 1

Each VT has two VCirs to handle the active and standby circuits. Note that the standby circuits (white) are illustrated on different internal GE ports. However, since both circuits 1 and 2 are not of the same metric (primary) at the same time, they could, in theory, be on the same internal port but the illustrated arrangement provides simplification in the preferred embodiment.

The use of FCIP trunking, with the virtual tunnels, virtual circuits and multiple TCP sessions, allows great freedom and flexibility, providing both load balancing and failover capabilities. The actual configurations may be developed without detailed direct user or administrator instruction based on default maximum conditions for the various virtual tunnels and circuits. The use of different IP addresses for the different circuits and different TCP session values for different virtual tunnels allows system load balancing, at both levels depending on the IP network, and the maintenance of priority values across the IP network.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An Internet Protocol (IP) device comprising:
a Fibre Channel (FC) port for receiving FC frames;
a tunnel manager coupled to the FC port for initiating creation of a Fibre Channel over Internet Protocol (FCIP) tunnel; and
al least one Ethernet port for receiving the FC frames, the at least one Ethernet port being coupled to the tunnel manager and FC port and including an Transmission Control Protocol/Internet Protocol (TCP/IP) interface configured to initiate creation of a first IP circuit in said FCIP tunnel and initiate creation of a second IP circuit in said FCIP tunnel.

2. The IP device of claim 1, wherein said first and second IP circuits are used to load balance traffic in said FCIP tunnel.

3. The IP device of claim 1, wherein said first and second IP circuits are used to provide failover capabilities in said FCIP tunnel.

4. The IP device of claim 1, wherein said TCP/IP interface is further configured to initiate creation of at least two transport control protocol (TCP) sessions for each of said first and second IP circuits, where data having a first priority of service is designated for transmission over a first of said TCP sessions and data having a second priority of service is designated for transmission over a second of said TCP sessions.

5. The IP device of claim 4, where control information is designated for transmission over a third of said TCP sessions.

6. The IP device of claim 4, wherein each of said IP circuits is specified as having minimum and maximum transmission rates and each of said TCP sessions carrying data is specified as having minimum and maximum transmission rates.

7. The IP device of claim 6, wherein the sums of the minimum transmission rates of each of said TCP sessions carrying data for each IP circuit equals said specified minimum transmission rate of the IP circuit and the maximum transmission rates of each of said TCP sessions carrying data for each IP circuit equals said specified maximum transmission rate of the IP circuit.

8. The IP device of claim 7, wherein if the sum of the maximum transmission rates of all TCP sessions carrying data having a given priority exceeds a designated maximum transmission rate, then multiple groups of TCP sessions carrying data at each said given priority are initiated until the sum of the maximum transmission rates of all TCP sessions carrying data in each group is less than or equal to said designated maximum transmission rate.

9. The IP device of claim 7, wherein each TCP session carrying data having a given priority has a designated maximum transmission rate and if the sum of said specified maximum transmission rates of said IP circuits exceeds said designated maximum transmission rate, additional TCP sessions carrying data at said given priority are initiated until the product of said designated maximum transmission rate and the number of TCP sessions carrying data at said given priority equals or exceeds said sum of said specified maximum transmission rates of said IP circuits.

10. A method comprising:
initiating creation of a Fibre Channel over Internet Protocol (FCIP) tunnel over an IP network;
initiating creation of a first IP circuit in said FCIP tunnel; and
initiating creation of a second IP circuit in said FCIP tunnel.

11. The method of claim 10, wherein said first and second IP circuits are used to load balance traffic in said FCIP tunnel.

12. The method of claim 10, wherein said first and second IP circuits are used to provide failover capabilities in said FCIP tunnel.

13. The method of claim 10, further comprising:
initiating creation of at least two transport control protocol (TCP) sessions for each of said first and second IP circuits, where data having a first priority of service is designated for transmission over a first of said TCP sessions and data having a second priority of service is designated for transmission over a second of said TCP sessions.

14. The method of claim 13, where control information is designated for transmission over a third of said TCP sessions.

15. The method of claim 13, wherein each of said IP circuits is specified as having minimum and maximum transmission rates and each of said TCP sessions carrying data is specified as having minimum and maximum transmission rates.

16. The method of claim 15, wherein the sums of the minimum transmission rates of each of said TCP sessions carrying data for each IP circuit equals said specified minimum transmission rate of the IP circuit and the maximum transmission rates of each of said TCP sessions carrying data for each IP circuit equals said specified maximum transmission rate of the IP circuit.

17. The method of claim 16, wherein if the sum of the maximum transmission rates of all TCP sessions carrying data having a given priority exceeds a designated maximum transmission rate, then multiple groups of TCP sessions carrying data at each said given priority are initiated until the sum of the maximum transmission rates of all TCP sessions carrying data in each group is less than or equal to said designated maximum transmission rate.

18. The method of claim 16, wherein each TCP session carrying data having a given priority has a designated maximum transmission rate and if the sum of said specified maximum transmission rates of said IP circuits exceeds said designated maximum transmission rate, additional TCP sessions carrying data at said given priority are initiated until the product of said designated maximum transmission rate and the number of TCP sessions carrying data at said given priority equals or exceeds said sum of said specified maximum transmission rates of said IP circuits.

19. The IP device of claim 1, wherein there is only one Ethernet port in the at least one Ethernet port and the first IP circuit and the second IP circuit are provided through that one Ethernet port.

20. The IP device of claim 1, wherein there are two Ethernet ports in the at least one Ethernet port, with the first IP circuit from one of the two Ethernet ports and the second IP circuit from the other of the two Ethernet ports.

21. The method of claim 10, wherein the first IP circuit and the second IP circuit are provided from one Ethernet port.

22. The method of claim 10, wherein the first IP circuit is provided from a first Ethernet port and the second IP circuit is provided from a second Ethernet port.

* * * * *